United States Patent
Saini et al.

(10) Patent No.: US 11,397,086 B2
(45) Date of Patent: Jul. 26, 2022

(54) CORRECTION OF MOTION SENSOR AND GLOBAL NAVIGATION SATELLITE SYSTEM DATA OF A MOBILE DEVICE IN A VEHICLE

(71) Applicant: QUALCOMM Incorporated, San Diego, CA (US)

(72) Inventors: Vinod Kumar Saini, Alwar (IN); Abdelmonaem Lakhzouri, Fremont, CA (US); Bo Zheng, Sunnyvale, CA (US); William Morrison, San Francisco, CA (US); Vivek Sankaravadivel, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 16/735,356

(22) Filed: Jan. 6, 2020

(65) Prior Publication Data
US 2021/0207961 A1 Jul. 8, 2021

(51) Int. Cl.
*G01C 21/16* (2006.01)
*G01S 19/47* (2010.01)
*G01C 21/18* (2006.01)

(52) U.S. Cl.
CPC ........... *G01C 21/165* (2013.01); *G01C 21/18* (2013.01); *G01S 19/47* (2013.01)

(58) Field of Classification Search
CPC ....... G01C 21/18; G01C 21/165; G01S 19/47; G01S 19/49; H04W 4/48
See application file for complete search history.

(56) References Cited

U.S. PATENT DOCUMENTS

| | | | | |
|---|---|---|---|---|
| 9,784,582 | B2 * | 10/2017 | Georgy | G01S 19/47 |
| 9,888,392 | B1 * | 2/2018 | Snyder | H04W 4/027 |
| 2010/0198511 | A1 * | 8/2010 | Hunter | G01C 21/28 701/472 |
| 2014/0379207 | A1 * | 12/2014 | Katsman | G01C 21/165 701/33.2 |
| 2015/0153380 | A1 * | 6/2015 | Elhoushi | G01P 15/14 702/141 |
| 2017/0030716 | A1 * | 2/2017 | Ali | G06K 9/00845 |
| 2018/0372499 | A1 * | 12/2018 | Ali | G01C 21/165 |
| 2021/0207961 | A1 * | 7/2021 | Saini | G01C 21/18 |

* cited by examiner

*Primary Examiner* — Nicholas Kiswanto
(74) *Attorney, Agent, or Firm* — Qualcomm Incorporated

(57) ABSTRACT

Aspects of the disclosure relate to initializing an inertial navigation system (INS) of a mobile device. Accelerometer bias of a plurality of accelerometers of the mobile device, and gyroscope bias of a plurality of gyroscopes of the mobile device, are determined. A first spatial relationship between a first frame of reference of the mobile device and a second frame of reference of a vehicle transporting the mobile device is determined. A second spatial relationship between the first frame of reference and a third frame of reference of a surface beneath the vehicle is determined. Each of the frames of reference are determined based on output of at least two of the GNSS receiver, the plurality of accelerometers, or the plurality of gyroscopes. The INS is provided with the accelerometer bias, the gyroscope bias, the first spatial relationship, and the second spatial relationship to initialize the INS.

28 Claims, 19 Drawing Sheets

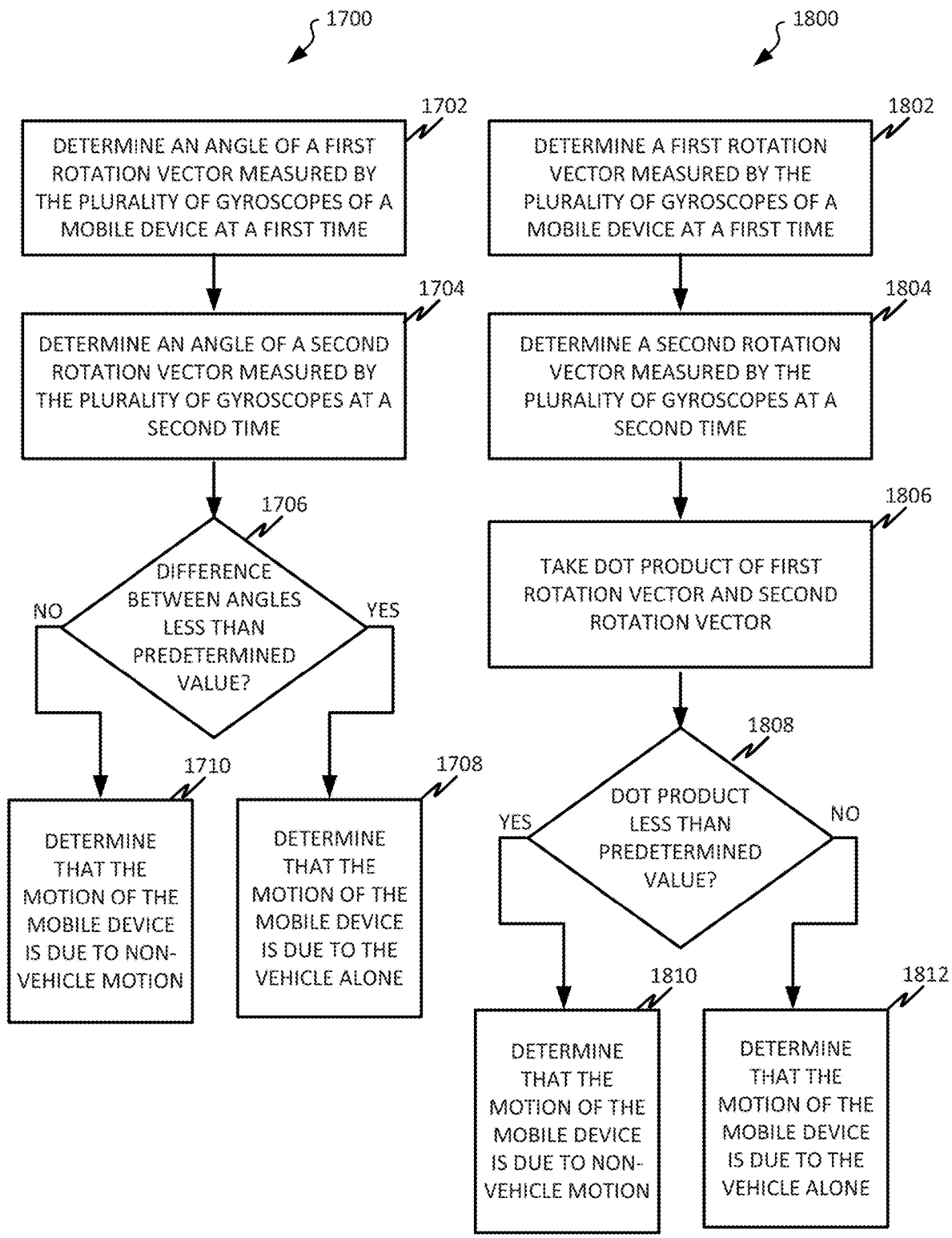

CORRECTION OF MOTION SENSOR AND GLOBAL NAVIGATION SATELLITE SYSTEM DATA OF A MOBILE DEVICE IN A VEHICLE

BACKGROUND

Field

The present disclosure relates to the field of mobile device navigation. More specifically, the present disclosure relates to initialization of an inertial navigation system in a mobile device that is transported within a vehicle.

Background

Navigation systems are ubiquitous. In their early days, navigation systems were available on home and work computers. A user wishing to obtain directions might enter their present location and their desired destination into the navigation system and the navigation system would provide a list of turn-by-turn instructions that the user could print out and carry with them. Modern navigation systems are now portable. Their hardware is routinely included in mobile devices, such as cellular telephones. The hardware may incorporate a global navigation satellite system (GNSS) receiver, an inertial measurement unit (IMU), and an inertial navigation system (INS). Data from the GNSS receiver can be used alone to compute the mobile device position and velocity, or the data from the GNSS receiver may be used in conjunction with accelerometers and gyroscopes to compute the mobile device position and velocity. IMUs combine the hardware of accelerometers and gyroscopes. Output of the GNSS receiver and IMU may be applied to an inertial navigation system (INS) of the mobile device to improve accuracy.

Mobile devices are being used more frequently as navigation aids. One reason for their use as navigation aids is that the maps of mobile applications on mobile devices may be more accurate and up to date when compared to the maps included with many original equipment manufacturer (OEM) vehicle navigation systems.

However, issues may arise when using a mobile device as a navigation aid. The issues may arise when, for example, a frame of reference of the mobile device is not aligned with a frame of reference of the vehicle, not aligned with a frame of reference of the Earth, or a combination of both. When the frames of reference are not aligned, the inertial navigation system of the mobile device may lose accuracy. Methods and apparatus described herein may address these issues and may improve the accuracy of an inertial navigation system used in a mobile device while the mobile device is being transported in a vehicle.

SUMMARY

The following presents a brief summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a brief form as a prelude to the more detailed description that is presented later.

In one example, a mobile device is disclosed. The mobile device may include a global navigation satellite system (GNSS) receiver, a plurality of accelerometers, and a plurality of gyroscopes. An inertial navigation system (INS) may be operationally coupled to the GNSS receiver, the plurality of accelerometers, and the plurality of gyroscopes. A motion-bias-orientation circuit may be operationally coupled to the GNSS receiver, the plurality of accelerometers, the plurality of gyroscopes, and INS. According to one aspect, the motion-bias-orientation circuit may be configured to determine accelerometer bias of the plurality of accelerometers based on output of the plurality of accelerometers and determine gyroscope bias of the plurality of gyroscopes based on output of the plurality of gyroscopes. The motion-bias-orientation circuit may be further configured to determine a first spatial relationship between a first frame of reference of the mobile device and a second frame of reference of a vehicle transporting the mobile device, based on output from at least two of the GNSS receiver, the plurality of accelerometers, or the plurality of gyroscopes. The motion-bias-orientation circuit may be still further configured to determine a second spatial relationship between the first frame of reference of the mobile device and a third frame of reference of a surface beneath the vehicle, based on output from at least two of the GNSS receiver, the plurality of accelerometers, or the plurality of gyroscopes. The motion-bias-orientation circuit may provide the INS with the accelerometer bias, the gyroscope bias, the first spatial relationship, and the second spatial relationship to initialize the INS.

In another example, a method of initializing an inertial navigation system (INS) of a mobile device is disclosed. The method may be operational at the mobile device. The method may include determining accelerometer bias of a plurality of accelerometers of the mobile device based on output of the plurality of accelerometers. The method may also include determining gyroscope bias of a plurality of gyroscopes of the mobile device based on output of the plurality of gyroscopes. Still further, the method may include determining a first spatial relationship between a first frame of reference of the mobile device and a second frame of reference of a vehicle transporting the mobile device, based on output of at least two of a global navigation satellite system (GNSS) receiver, the plurality of accelerometers, or the plurality of gyroscopes. Additionally, the method may still further include determining a second spatial relationship between the first frame of reference of the mobile device and a third frame of reference of a surface beneath the vehicle, based on output of at least two of the GNSS receiver, the plurality of accelerometers, or the plurality of gyroscopes. According to some aspects, the method may yet further include providing the INS with the accelerometer bias, the gyroscope bias, the first spatial relationship, and the second spatial relationship to initialize the INS.

According to one aspect, a non-transitory machine-readable storage medium having one or more instructions stored thereon is disclosed. In some examples, the one or more instructions, which when executed by at least one processing circuit of a mobile device, may cause the at least one processing circuit to perform several actions. The instructions may cause the processing circuit to determine accelerometer bias of a plurality of accelerometers of the mobile device based on output of the plurality of accelerometers and determine gyroscope bias of a plurality of gyroscopes of the mobile device based on output of the plurality of gyroscopes. The instructions may further cause the processing circuit to determine a first spatial relationship between a first frame of reference of the mobile device and a second frame of reference of a vehicle transporting the mobile device, based on output of at least two of a global navigation satellite system (GNSS) receiver, the plurality of accelerometers, or the plurality of gyroscopes. Still further, the instructions may cause the processing circuit to determine a second spatial relationship between the first frame of reference of the mobile device and a third frame of reference of a surface beneath the vehicle, based on output of at least two of the GNSS receiver, the plurality of accelerometers, or the plurality of gyroscopes. According to one aspect, the instructions may yet further cause the processing circuit to provide an inertial navigation system (INS) of the mobile device with the accelerometer bias, the gyroscope bias, the first spatial relationship, and the second spatial relationship to initialize the INS.

According to yet another aspect, another mobile device is disclosed. The mobile device may include a global navigation satellite system (GNSS) receiver, and a plurality of accelerometers, a plurality of gyroscopes. An inertial navigation system (INS) may be operationally coupled to the GNSS receiver, the plurality of accelerometers, and the plurality of gyroscopes. The mobile device may further include means for determining accelerometer bias of the plurality of accelerometers based on output of the plurality of accelerometers and means for determining gyroscope bias of the plurality of gyroscopes based on output of the plurality of gyroscopes. The mobile device may still further include means for determining a first spatial relationship between a first frame of reference of the mobile device and a second frame of reference of a vehicle transporting the mobile device, based on output from at least two of the GNSS receiver, the plurality of accelerometers, or the plurality of gyroscopes. In addition, the mobile device may include means for determining a second spatial relationship between the first frame of reference of the mobile device and a third frame of reference of a surface beneath the vehicle, based on output from at least two of the GNSS receiver, the plurality of accelerometers, or the plurality of gyroscopes. According to this aspect, the mobile device may additionally include means for providing the INS with the accelerometer bias, the gyroscope bias, the first spatial relationship, and the second spatial relationship to initialize the INS.

These and other aspects of the disclosure will become more fully understood upon a review of the detailed description, which follows. Other aspects, features, and implementations of the present disclosure will become apparent to those of ordinary skill in the art, upon reviewing the following description of specific, exemplary implementations of the present disclosure in conjunction with the accompanying figures. While features of the present disclosure may be discussed relative to certain implementations and figures below, all implementations of the present disclosure can include one or more of the features discussed herein. In other words, while one or more implementations may be discussed as having certain features, one or more of such features may also be used in accordance with the various implementations of the disclosure discussed herein. In similar fashion, while exemplary implementations may be discussed below as device, system, or method implementations it should be understood that such exemplary implementations can be implemented in various devices, systems, and methods.

BRIEF DESCRIPTION OF THE DRAWINGS

FIG. 17 is a flow diagram depicting a method of determining that motion of a mobile device is due to the motion of a vehicle alone, operational at the mobile device, according to aspects described herein.

FIG. 18 is a flow diagram depicting an alternative method of determining that motion of a mobile device is due to the vehicle motion alone, operational at the mobile device, according to aspects described herein.

DETAILED DESCRIPTION

Figure 1:
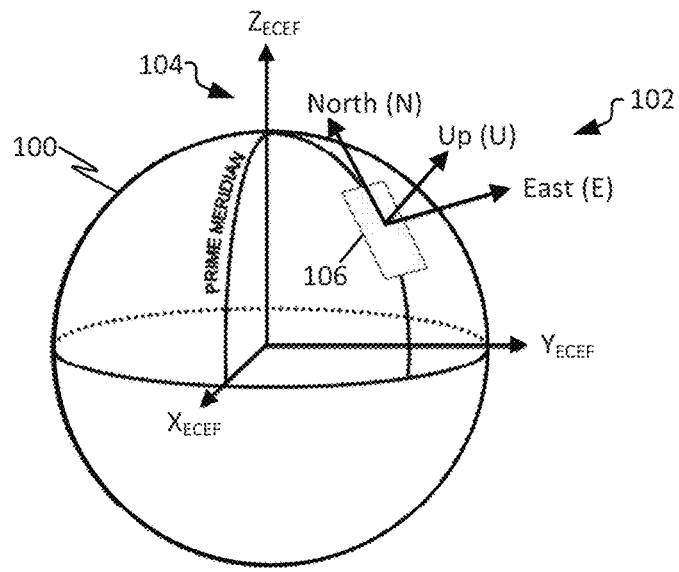
FIG. 1 is an illustration of a sphere or globe, representative of the Earth, having a first three-axis spatial reference system and an object on a surface of the globe that is oriented according a second three-axis spatial reference system of the object.

In the following description, specific details are given to provide a thorough understanding of the described implementations. However, it will be understood by one of ordinary skill in the art that the implementations may be practiced without these specific details. For example, circuits may be shown in block diagrams or in a simplified representation in order not to obscure the implementations in unnecessary detail. In other instances, well-known circuits, structures, and techniques may be shown in detail in order not to obscure the implementations.

As used herein, the word "vehicle" is used to refer to any form of transportation including automobiles, busses, trucks, and motorcycles. The preceding list is exemplary and non-limiting. Vehicles may include original equipment manufacturer (OEM) installed navigation systems. Mobile devices, as described below, may also include navigation systems. A vehicle navigation system is distinct from a mobile device navigation system, even when the mobile device is being transported within the vehicle.

As used herein, the terms "mobile device" and "device" are used interchangeably. A mobile device is used to refer to any portable device, handset, or user equipment that may include a GNSS receiver, an inertial measurement unit (IMU) (or distinct pluralities of accelerometers and gyroscopes), an inertial navigation system (INS), or any combination thereof or may include modules/circuits/functions that perform the same or similar functions as the GNSS receiver, the IMU, the INS, or any combination thereof. Examples of mobile devices include cellular telephones, smartphones, laptop computers, tablet computers, and wearable computers. The preceding descriptions and list are exemplary and non-limiting.

As used herein, a plurality of accelerometers may include two or more 1-axis accelerometers that may each be fabricated as a discrete component (e.g., discrete circuit and/or discrete structure) in a single package, or may include two or more 1-axis accelerometers, one or more n-axis accelerometers, where n is an integer greater than or equal to 2, or a combination thereof, combined into one or more packages. One or more circuits and/or structure may serve, for example, as a 1-, 2-, 3-, or more than 3-axis accelerometer. The plurality of accelerometers may be, for example, micro-electro-mechanical systems (MEMS) accelerometers. MEMS accelerometers may be, by way of example and not limitation, constructed of capacitive, variable capacitive, inductive, piezoelectric, or piezoresistive components, or any combination thereof. Other types of accelerometers are within the scope of the specification.

As used herein, a plurality of gyroscopes may include two or more 1-axis gyroscopes that may each be fabricated as a discrete component (e.g., discrete circuit and/or discrete structure) in a single package, or may include two or more 1-axis gyroscopes, one or more n-axis gyroscopes, where n is an integer greater than or equal to 2, or a combination thereof, combined into one or more packages. A gyroscope may alternatively be referred to as an angular rate sensor. One or more circuits and/or structure may serve, for example, as a 1-, 2-, 3-, or more than 3-axis gyroscope. The plurality of gyroscopes may be, for example, MEMS gyroscopes. MEMS gyroscopes may be, by way of example and not limitation, vibrating mass gyroscopes, vibrating structure gyroscopes, tuning fork gyroscopes, vibrating ring gyroscopes, piezoelectric plate gyroscopes, or any combination thereof. Other types of gyroscopes are within the scope of the specification.

Overview

In a mobile device being transported in a vehicle, initialization and/or re-initialization of an inertial navigation system (INS) of the mobile device as described herein provides the INS with accurate and reliable indications of accelerometer bias, gyroscope bias, orientation of the mobile device frame of spatial reference with respect to the vehicle and global frames of spatial reference.

Aspects described herein provide a mobile device architecture useful to initialize and re-initialize the INS of the mobile device, once the mobile device is stationary relative to the vehicle transporting the mobile device, and reduce errors in location fixes that may be attributable to the operation of the mobile device within the vehicle.

As used herein, reference to "motion sensors" is a reference to a plurality of accelerometers and a plurality of gyroscopes that may be present in an IMU. The challenges faced by the motion sensors and GNSS receiver in a mobile device include the fact that the orientation of the mobile device with respect to the vehicle transporting the mobile device is arbitrary and changes frequently. Additionally, the vehicle motion (e.g., changes to speed and direction) is arbitrary and the road surface on which the vehicle moves may be inclined or otherwise not flat. The motion sensors used in mobile devices may be inexpensive and may not be of the highest quality; therefore, motion sensor data on a mobile device may be noisy and biased. Furthermore, it is difficult to decouple vehicle motion from mobile device motion sensor measurements if the motion sensors are subjected to any external motion (e.g., the mobile device is dropped by the user, or the user turns the mobile device to take a photograph toward the side or rear of the vehicle).

Examples of motion sensors include accelerometers, gyroscopes, and inertial measurement units (IMUs) that include one or more accelerometers and gyroscopes. The IMU and the GNSS receiver provide data to an inertial navigation system (INS).

As described in greater detail below, initialization (or re-initializations) of the INS may occur when, for example, a module, circuit, function, or any combination thereof of the mobile device 300 detects that motion of the mobile device is due to the vehicle motion alone (e.g., dur to the motion of the vehicle transporting the mobile device), and not due to "non-vehicle motion." Motion due to the mobile device being in a state other than that of being stationary relative to the vehicle transporting the mobile device may be described as "non-vehicle motion" herein. For example, motion due to a user holding the mobile device is considered "non-vehicle motion" herein.

For example, in a state in which the mobile device is stationary relative to the vehicle transporting the mobile device and the vehicle makes a right turn (a vehicle motion), the mobile device makes the same right turn by virtue of the mobile device being stationary relative to the vehicle transporting the mobile device. While the mobile device is stationary relative to the vehicle transporting the mobile device and the vehicle makes a right turn, non-vehicle motion should not be detected as the motion of the mobile device was due to the vehicle motion alone. In contrast, in a state in which the vehicle travels in any direction (e.g., a straight-line direction or a turn direction) and a passenger ends a coupling of the mobile device with the vehicle by, for example, removing the mobile device from a cradle and concurrently or sequentially turning the mobile device to the right to take a photograph through the passenger window of the vehicle, non-vehicle motion should be detected (as the turn of the mobile device to the right was not a result of any change of vehicle motion).

Frames of Reference

A mobile device frame of spatial reference may be referred to herein as a mobile device frame of reference, a mobile device frame, or an inertial measurement unit frame (an IMU frame). The IMU frame is described in terms of a set of X, Y, and Z coordinate axes.

A vehicle frame of spatial reference may be referred to herein as a vehicle frame of reference, a vehicle frame, or a right, forward, up frame (RFU frame). The RFU frame is described in terms of a set of right, forward, and up coordinate axes.

A global (Earth) frame of spatial reference may be referred to herein as a global frame of reference, a global frame, or an east, north, up frame (ENU frame). The ENU frame is described in terms of a set of east, north and up coordinate axes.

The IMU frame, RFU frame, and ENU frame are independent of one another.

FIG. 1 is an illustration of a sphere or globe 100, representative of the Earth, having a first three-axis spatial reference system 104 and an object on a surface of the globe 100 that is oriented according a second three-axis spatial reference system of the object. The first three-axis spatial reference system 104 is known as an Earth Centered Earth Fixed (ECEF) coordinate system. The origin (0,0,0) of the ECEF coordinate system is at the center of the mass of the Earth. The three axis $X_{ECEF}$, $Y_{ECEF}$, and $Z_{ECEF}$ of the ECEF coordinate system (that is, first three-axis spatial reference system 104 of the globe 100) are orthogonal and follow the right-hand rule, where the $Z_{ECEF}$ axis points in the direction of the thumb of a right hand as the fingers of the right hand curl around the $Z_{ECEF}$ axis from the $X_{ECEF}$ axis toward the $Y_{ECEF}$ axis.

To be useful to position and orient a vehicle on the surface of the Earth, it may be useful to establish a second three-axis spatial reference system that is tangential to the surface of the Earth (that is, the surface of the globe 100) at a point that is local to the vehicle (that is, on a surface of the Earth beneath the vehicle). At the surface of the globe 100 (e.g., the surface of the Earth) beneath the vehicle, the surface of the globe 100 is approximately flat. A tangent plane 106 that touches the surface of the globe 100 at the place where the vehicle contacts the surface is depicted in FIG. 1. The tangent plane 106 may be used to define the second three-axis spatial reference system. The origin (0,0,0) of the second three-axis spatial reference system lies on the tangent plane 106 at the point where the vehicle touches the surface of the globe 100. The three axes east (E), north (N), and up (U) of the second three-axis spatial reference system are orthogonal and follow the right-hand rule. The second three-axis spatial reference system may be referred to as the ENU coordinate system or the ENU frame 102.

A global navigation satellite system (GNSS) provides data related to motion and location on the surface of the Earth, that is, on the tangent plane 106. GNSS is used herein as an umbrella term that encompasses all global satellite positioning systems. This includes constellations of satellites orbiting over the Earths surface and continuously transmitting signals that enable users to determine their position on or above the surface of the Earth. Examples of GNSS systems include the Global Positioning System (GPS) of the United States, the Global Navigation Satellite System (GLONASS) of Russia, the Galileo system of the European Union, and the BieDou system of China. Today's mobile devices all include GNSS receivers. Many of the GNSS receivers operate using one or more (simultaneously or as back-up) of the just named GNSS systems. Other countries, including Japan and India are also fielding GNSS systems of their own.

Figure 2:
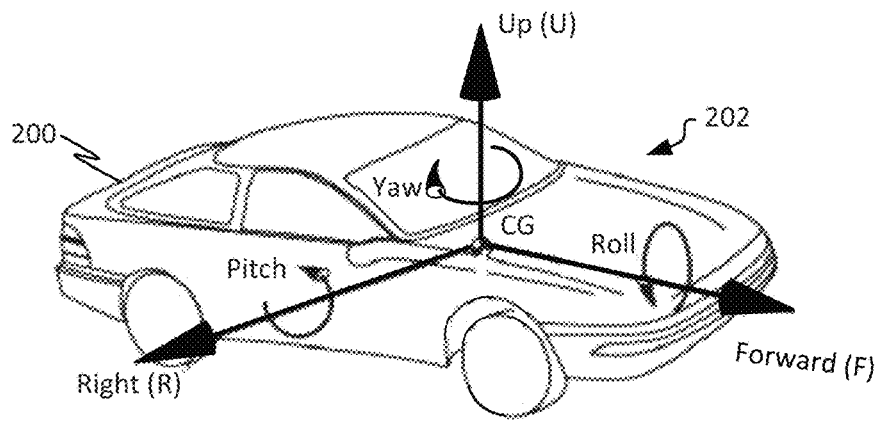
FIG. 2 is an illustration of a vehicle with a third three-axis spatial reference system superimposed on the vehicle.

FIG. 2 is an illustration of a vehicle 200 with a third three-axis spatial reference system superimposed on the vehicle 200. The third three-axis spatial reference system may be referred to herein as the RFU frame 202. As depicted, the longitudinal, forward-facing direction is along the forward (F) axis, the lateral, or right-facing direction is along the right (R) axis, and the upward or up-facing direction is along the up (U) axis. The origin (0,0,0) of the third three-axis spatial reference system is at the center of gravity (CG) of the vehicle 200. The vehicle 200 has six degrees of rotational freedom: 1) translation along the F axis, 2) translation along the R axis, 3) translation along the U axis, 4) rotation about the F axis (also known as roll), 5) rotation about the R axis (also known as pitch), and 6) rotation about the U axis (also known as yaw). The positive directions of the F, R, and U axis and the positive directions of roll, pitch, and yaw are shown in the illustration of the vehicle 200.

Figure 3:
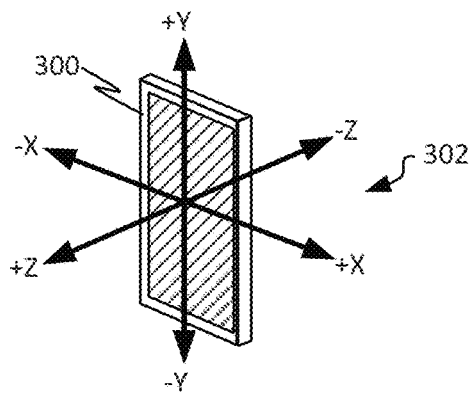
FIG. 3 is an illustration of a mobile device with a fourth three-axis spatial reference system superimposed on the mobile device.

FIG. 3 is an illustration of a mobile device 300 with a fourth three-axis spatial reference system superimposed on the mobile device 300. The fourth three-axis reference system may be referred to herein as the IMU frame 302 because the IMU of the mobile device 300 is fixed to the mobile device 300 and the axes of the IMU generally correspond to the axes of the mobile device 300. As depicted, the longitudinal, forward-facing direction is along the Z axis, the lateral, or right-facing direction is along the X axis, and the upward or up-facing direction is along the Y axis. The origin (0,0,0) of the fourth three-axis spatial reference system may be at the dimensional center of the mobile device 300, the center of gravity of the mobile device 300, centered upon the IMU of the mobile device 300, or at any point on or within the mobile device 300 as determined by one of skill in the art. The mobile device 300 also has six degrees of rotational freedom: 1) translation along the Z axis, 2) translation along the X axis, 3) translation along the Y axis, 4) rotation about the Z axis (also known as roll), 5) rotation about the X axis (also known as pitch), and 6) rotation about the Y axis (also known as yaw). The positive directions of the X, Y, and Z axis are shown in the illustration of the mobile device 300. Depictions of pitch, roll, and yaw are omitted to avoid cluttering the drawing.

The mobile device 300 may be, for example, mounted in a cradle, secured to a bracket, clipped to a an air vent of a dashboard of the vehicle 200, placed in a cup-holder (with or without being placed in a cradle in the cup holder) of the vehicle 200, or otherwise stationary relative to the vehicle 200 transporting the mobile device 300. As used herein, the term "stationary relative to the vehicle transporting the mobile device" or "stationary relative to the vehicle" may mean, for example, the mobile device and the vehicle being in a static or un-moving relationship, one to the other. The mobile device may be stationary relative to the vehicle transporting the mobile device in a state in which the mobile device is temporarily coupled or removably coupled to the vehicle by mechanical, magnetic, suction, or any combination thereof of coupling of the mobile device to the vehicle, either directly (e.g., by being placed into a coup holder) or through an intermediary cradle, bracket, clip, or the like. As used herein, the mobile device 300 may be stationary relative to the vehicle transporting the mobile device in a state in which the RFU frame 202 and the IMU frame 302 have an orientation, one to the other, that is fixed or substantially fixed in space over a given time, T. The axes of the orientations may not be aligned.

Due to differences in orientation between the IMU frame 302 and the RFU frame 202 (e.g., IMU-to-RFU orientation), the IMU frame 302 and the ENU frame 102 (e.g., IMU-to-ENU orientation), or both, over periods of time between initializations (or re-initializations) of the INS of the mobile device 300, the INS output may become skewed or otherwise inaccurate. Although the three spatial reference systems ENU, RFU, and XYZ are independent of each other, vectors in the IMU frame may be rotated to align with the RFU frame and the ENU frame.

Three parameters are used to describe orientations in a 3-dimensional Euclidean space. There are several ways to express a rotation between first and second three-axis coordinate systems (e.g., an orientation). Two definitions are provided below. Each provides the same results. One way makes use of a set of Euler angles. The other way makes use of a rotation matrix. Other ways to represent orientation include Tait-Bryan angles. Additional ways to represent orientation as known to those of skill in the art are within the scope of the disclosure.

Figure 4:
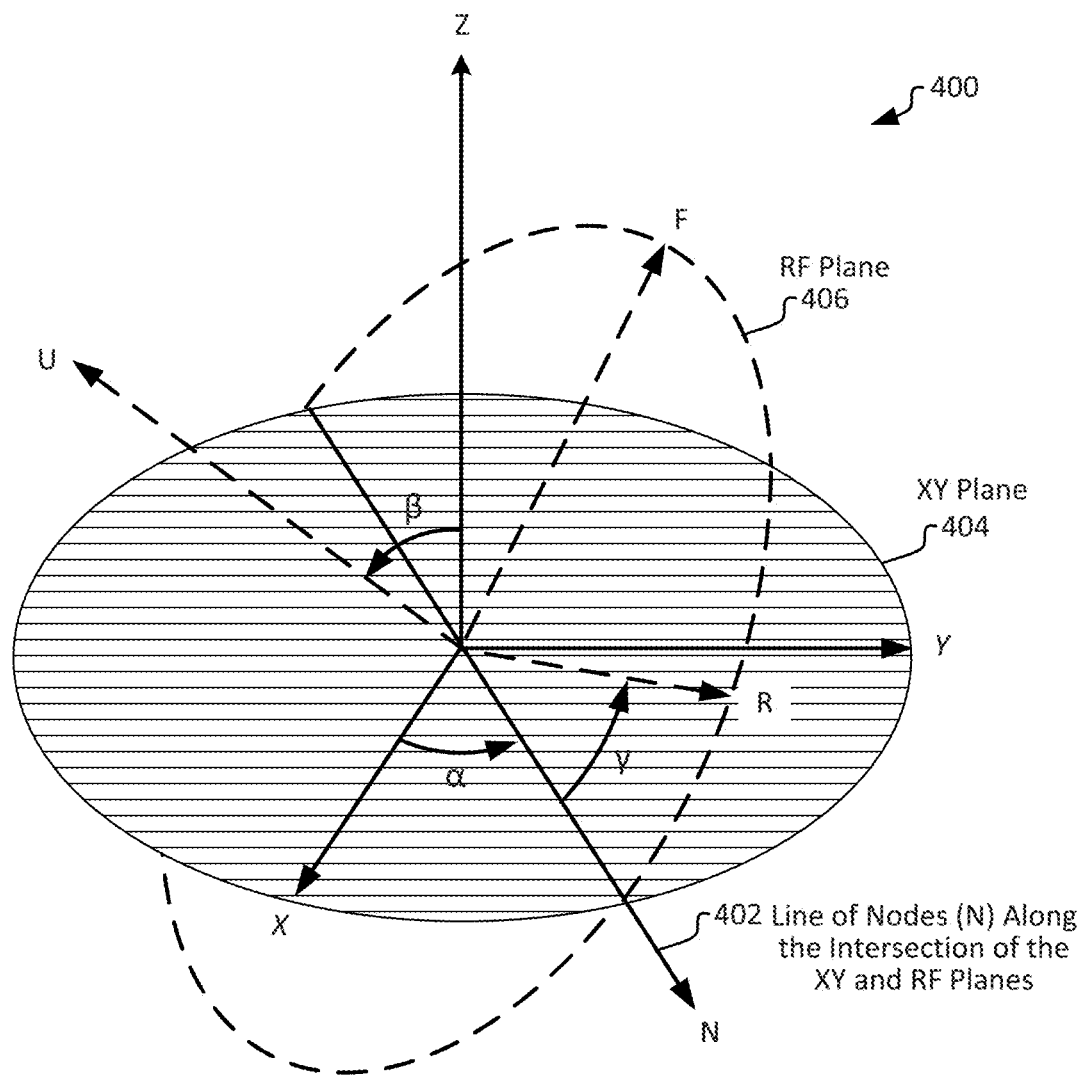
FIG. 4 is a graphical representation of a set of Euler angles.

FIG. 4 is a graphical representation of the set of Euler angles 400. The set of Euler angles is a set of three angles used to describe an orientation of a rigid body with respect to a fixed coordinate system. The coordinate axes of the IMU frame (XYZ) and the RFU frame (RFU) are shown for exemplary purposes. The RFU axes could be replaced with the ENU axes to describe rotation of the IMU frame into the ENU frame. The XYZ (fixed) system (e.g., the IMU system) is shown in solid line, the RFU (rotated) system (e.g., the RFU system) is shown in dashed line. Selectin of the fixed and rotated systems is arbitrary. A line of nodes 402 along the intersection of the XY plane 404 and the RF plane 406 is represented by the letter N.

Described hereinbelow is a mobile device-to-vehicle orientation estimator. The mobile device-to-vehicle orientation estimator performs a coordinate translation between the three-axis coordinate system (XYZ) of the mobile device (also referred to herein as the IMU frame) and the three-axis coordinate system (RFU) of the vehicle (also referred to herein as the RFU frame). The mobile device-to-vehicle orientation estimator may use, for example, a set of Euler angles or Tait-Bryan angles, or a rotation matrix to relate the two triads.

According to a geometric definition of Euler angles, the axes of the original frame (e.g., the IMU frame) are denoted as XYZ and the axes of the rotated frame (the REF frame) are denoted as RFU. The geometrical definition begins by defining the line of nodes 402 (N) as an intersection of the XY plane 404 and the RF plane 406. The set of three Euler angles can be defined as follows:

$\alpha$ is the angle between the X axis and the line of nodes 402 (N) axis.

$\beta$ is the angle between the Z axis and the U axis.

$\gamma$ is the angle between the line of nodes 402 (N) axis and the R axis.

Euler angles can also be expressed in terms of extrinsic rotations. Extrinsic rotations are elemental rotations that occur about the axes of the fixed coordinate system XYZ (here the IMU frame) of a mobile device. The RFU system rotates, while XYZ system is fixed. Starting with RFU overlapping XYZ, a composition of three extrinsic rotations can be used to reach any target orientation for RFU. The Euler or Tait-Bryan angles ($\alpha$, $\beta$, $\gamma$) are the amplitudes of the elemental rotations. For instance, the target orientation can be reached as follows:

The RFU system rotates about the Z axis by $\gamma$. The R axis is now at angle $\gamma$ with respect to the X axis.

The RFU system rotates again about the X axis by $\beta$. The U axis is now at angle $\beta$ with respect to the Z axis.

The RFU system rotates a third time about the Z axis by $\alpha$.

In sum, the three elemental rotations occur about Z, X and Z.

Any orientation can be achieved by composing three elemental rotations, starting from a known standard orientation. Equivalently, any 3×3 rotation matrix, ROTATION, can be decomposed as a product of three elemental rotation matrices. For instance:

$$\text{ROTATION} = R(\alpha)F(\beta)U(\gamma)$$

is a rotation matrix that may be used to represent a composition of extrinsic rotations about axes Z, Y, X, (in that order).

To convert data in a first coordinate system to a second coordinate system one would multiply the data in the first coordinate system by a 3×3 rotation matrix (such as the 3×3 rotation matrix ROTATION) and the data would be brought into the second coordinate system.

Exemplary First Mobile Device

Figure 5:
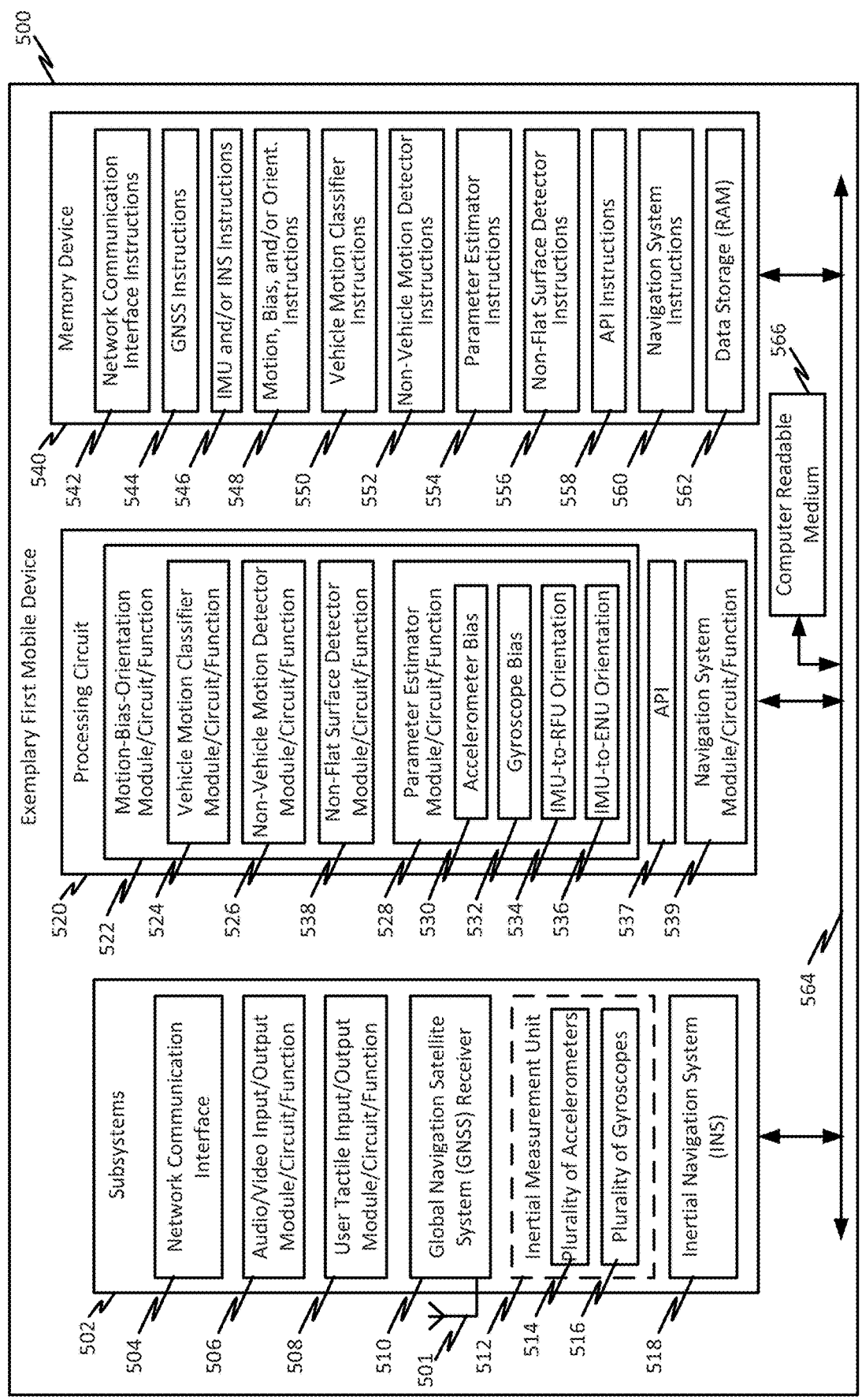
FIG. 5 is a simplified block diagram illustrating an exemplary implementation of a first mobile device, according to aspects described herein.

FIG. 5 is a simplified block diagram illustrating an exemplary implementation of a first mobile device 500, according to aspects described herein. The first mobile device 500 may be the same or similar to the mobile device 300 of FIG. 3, the third mobile device 700 of FIG. 7, and/or the fourth mobile device 800 of FIG. 8. The preceding list is exemplary and not limiting.

The first mobile device 500 employs subsystems 502, a processing circuit 520, and a memory device 540, according to aspects described herein.

In general, the subsystems 502 of the first mobile device 500 may be common to all mobile devices, such as mobile device 300 of FIG. 3. The subsystems 502 may include, for example, a network communication interface 504. The network communication interface 504 may include one or more transceivers (not shown) and one or more antennas (not shown) that provide a means for communicating with various other apparatus over a transmission medium. Examples transceivers include radio input/output modules/circuits/functions, and include any radio used to wirelessly transmit and receive any communications according to, but not limited to any versions of wireless network communication protocols described herein. Examples of wireless network communication protocols include 3G, 4G, 4G LTE, 4G LTE+, and 5G voice and data networks, IEEE 802.11 WiFi wireless local area network (WLAN) computer communication networks, IEEE 802.15.4 low rate wireless personal area networks (PANs) such as ZigBee®, and IEEE. 802.16 broadband wireless access such as WiMAX®. Other types of wireless networks, wireless communication protocols, and future versions of the just mentioned wireless networks and wireless communication protocols are within the scope of the disclosure. The preceding list is exemplary and not limiting.

The subsystems 502 of the first mobile device 500 may include audio/video 506 input/output modules/circuits/functions. Examples of audio/video 506 input/output modules/circuits/functions include microphones for audio input, speakers for audio output, cameras for video input, and display screens for video output. The subsystems 502 may also include, for example, user tactile 508 input/output modules/circuits/functions. Examples of user tactile 508 input/output modules/circuits/functions include buttons, keyboards, or a combination thereof. Additional examples of user tactile 508 input/output modules/circuits/functions include fingerprint scanners for tactile input, and haptic features, such as vibrators, for tactile output.

The subsystems 502 may also include, for example, a Global Navigation Satellite System (GNSS) receiver (hereinafter referred to as the GNSS receiver 510). Examples of the GNSS receiver 510 may include a receiver that operates according to the standards set by GPS, GLONASS, Galileo, BeiGu, or any combination thereof. The GNSS receiver 510 may employ one or more of the preceding standards (alone or simultaneously) to provide real time geospatial location of the first mobile device 500 within which the first mobile device 500 resides. A GNSS receiver 510 may include an antenna(s) 501 and processing circuit or may share the antenna(s) 501 and the processing circuit 520 with the first mobile device 500. The GNSS receiver 510 provides real-time location, direction, and speed across the surface of the Earth using Earth orbiting satellites. More specifically, the GNSS receiver 510 provides pseudo-ranges and Doppler data. The pseudo-ranges and Doppler data are measurements of absolute distance from each satellite and measurements of rate of position change relative to each satellite, respectively. The operation of GNSS is well known and will not be provided herein for the sake of brevity.

The subsystems 502 may also include an inertial measurement unit (IMU) (hereinafter referred to as the IMU 512) with an attendant plurality of accelerometers 514 and plurality of gyroscopes 516. The plurality of accelerometers 514 measure acceleration along three orthogonal axes of a first frame of reference (e.g., the IMU frame) and the plurality of gyroscopes 516 measure rotation about the three orthogonal axes. The plurality of accelerometers 514 may be of any type know in the art, and all types of accelerometers are included within the scope of the disclosure. According to some aspects, the plurality of gyroscopes 516 may be of the type known as micro-electro-mechanical systems (MEMS) gyroscopes. Other types of gyroscopes are within the scope of the disclosure. The IMU 512 may use the plurality of accelerometers 514 for translational motion sensing and the plurality of gyroscopes 516 for rotational motion sensing.

The subsystems 502 may also include an inertial navigation system (INS) (hereinafter referred to as the INS 518). The INS 518 receives data from both the GNSS receiver 510 and the IMU 512. According to some aspects, data received from the GNSS receiver 510 by the INS 518 may be speed data, data received from the plurality of accelerometers 514 may be translational motion data, and data received from the plurality of gyroscopes 516 may be rotational motion data. The data may be provided as three-dimensional vectors. The speed data, the translational motion data, and the rotational motion data may be asynchronous.

The first mobile device 500 may be implemented with the processing circuit 520. The processing circuit 520 may be implemented as one processing circuit or a plurality of processing circuits (not shown). The processing circuit 520 may be configured to perform any one or more of the functions and/or processes described herein, including functions and/or processes illustrated in FIGS. 12-23. Examples of the processing circuit 520 may include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionalities and processes described throughout the disclosure. In fact, the just exemplified and other types of similar hardware may be the structural means that may be used to implement the various functionalities and processes described throughout the disclosure. For example, the processing circuit 520, the motion-bias-orientation circuit 522, the parameter estimator circuit 528, and/or other circuits may be examples of the means for determining accelerometer bias of the plurality of accelerometers 514 based on output of the plurality of accelerometers 514, the means for determining gyroscope bias of the plurality of gyroscopes 516 based on output of the plurality of gyroscopes 516, the means for determining a first spatial relationship between a first frame of reference of the first mobile device 500 and a second frame of reference of a vehicle transporting the first mobile device 500, based on output from at least two of the GNSS receiver 510, the plurality of accelerometers 514, or the plurality of gyroscopes 516, the means for determining a second spatial relationship between the first frame of reference of the first mobile device 500 and a third frame of reference of a surface beneath the vehicle, based on output from at least two of the GNSS receiver 510, the plurality of accelerometers 514, or the plurality of gyroscopes 516, the means for determining that the first mobile device 500 is stationary relative to the vehicle transporting the first mobile device 500, the means for initializing the INS 518 by, for example, providing the INS with accelerometer bias, gyroscope bias, the first spatial relationship, and the second spatial relationship upon determining that the first mobile device 500 is stationary relative to the vehicle transporting the first mobile device 500, and the means for classifying motion of the first mobile device 500 according to both a first state and a second state. According to some aspects, the means for determining the first spatial relationship re-determines the first spatial relationship and the means for determining the second spatial relationship re-determines the second spatial relationship.

The processing circuit 520 may be implemented with a bus architecture, represented generally by the bus 564. The bus 564 may include any number of interconnecting buses and bridges depending on the specific application of the processing circuit 520 and the overall design constraints. The bus 564 communicatively couples together the subsystems 502 including the network communication interface 504, the audio/video 506 input/output module/circuit/function, the user tactile 508 input/output module/circuit/function, the GNSS receiver 510, the IMU 512, the plurality of accelerometers 514, the plurality of gyroscopes 516, and INS 518. Additionally, the bus 564 communicatively couples together the one or more processing circuits (represented generally by the processing circuit 520), a memory device 540, and computer-readable media (represented generally by the computer-readable medium 566, which may be a non-transitive computer-readable medium). The bus 564 may also communicatively couple a GNSS or INS selection module circuit/function (not shown), an application program interface (API 537), and/or a navigation system 539 module/circuit/function to the processing circuit 520. The bus 564 may also link various other circuits such as timing sources, peripherals, voltage regulators, and power management circuits, which are well known in the art, and therefore, will not be described any further. A bus interface (not shown) may provide an interface between any one or more of the modules/circuits/functions depicted in FIG. 5.

The processing circuit 520 may include, implement, or both, a motion-bias-orientation module/circuit/function (although the component parts, functions, and features of the motion-bias-orientation module/circuit/function could be implemented as one or more subsystems). The motion-bias-orientation circuit 522 may include a vehicle motion classifier 524 module/circuit/function configured to classify motion of a vehicle that transports the first mobile device 500.

The vehicle motion classifier 524 module/circuit/function may be configured to receive input from the GNSS receiver 510, the plurality of accelerometers 514, the plurality of gyroscopes 516, or any combination thereof and may be configured to determine and classify vehicle motion. Classifications of motion may include, by way of example and not limitation, a straight-line direction, a turn direction, and a stationary state.

The motion-bias-orientation circuit 522 may include a non-vehicle motion detector 526 module/circuit/function that may receive input from the GNSS receiver 510, the plurality of accelerometers 514, the plurality of gyroscopes 516, or any combination thereof and may be configured to determine if a change in motion detected by the plurality of accelerometers 514, the plurality of gyroscopes 516, or both is due to the vehicle motion alone or if the motion detected is due to non-vehicle motion (e.g., is due to a user removing the first mobile device 500 from a cradle or otherwise ending the coupling of the first mobile device 500 with the vehicle 200).

According to one aspect, the non-vehicle motion detector 526 module/circuit/function may be configured to make the determination as to whether the change of motion detected is due to vehicle motion alone or due to non-vehicle motion every epoch. A more detailed description of the non-vehicle motion detector 526 is provided hereinbelow.

Detecting non-vehicle motion is useful as the initialization and periodic re-initialization of the motion sensors and GNSS receiver described herein is valid in the state in which the first mobile device 500 is stationary relative to the vehicle 200 transporting the first mobile device 500. The initialization and periodic re-initialization of the INS 518 described herein is not valid in the state in which the first mobile device 500 is not stationary relative to the vehicle 200 transporting the first mobile device 500, as in the state in which the first mobile device 500 is being held in the hand of a user. Accordingly, an output of the non-vehicle motion detector 526 may provide a yes/no or a go/no-go indication for the initialization and periodic re-initialization of the INS 518 as described herein.

The processing circuit 520 may also include, implement, or both, a parameter estimator module/circuit/function or a parameter estimator circuit 528 configured to determine parameters using one or more sub-modules/circuits/functions. The parameters and the sub-modules/circuits/functions may include accelerometer bias determined by an accelerometer bias 530 module/circuit/function, gyroscope bias determined by a gyroscope bias 532 module/circuit/function, IMU-to-RFU orientation (e.g., coordinate translation or IMU-to-RFU rotation matrix) determined by an IMU-to-RFU orientation 534 module/circuit/function, and IMU-to-ENU orientation (e.g., coordinate translation or IMU-to-ENU rotation matrix) determined by an IMU-to-ENU orientation 536 module/circuit/function. The parameter estimator circuit 528 may be operationally coupled to, and receive data from, the GNSS receiver 510, the IMU 512 (that is, the plurality of accelerometers 514 and plurality of gyroscopes 516). The parameter estimator circuit 528 may be operationally coupled to the INS 518 and provide any combination of the just recited parameters to the INS 518. According to some aspects the parameter estimator circuit 528 may be operationally coupled to the INS 518 and provide, for example, four parameters (or data representations thereof) to the INS 518.

The accelerometer bias may be due to the inexpensive and noisy nature of the accelerometers present in mobile devices. As explained hereinbelow, the accelerometer bias 530 module/circuit/function may determine the accelerometer bias, $a_{bias}$, by taking a static (non-moving) measurement of the acceleration vector. In the static case, the measured accelerometer vector will be comprised of the gravity vector and the accelerometer bias. Knowledge of the gravity vector permits the calculation of the accelerometer bias $a_{bias}$.

Gyroscope bias may be due to the inexpensive and noisy nature of the gyroscopes present in mobile devices. Similar to the accelerometer bias 530 module/circuit/function, the gyroscope bias 532 module/circuit/function may determine gyroscope bias by taking a static (non-moving) measurement of the rotation vector. In the static case, the measured rotation vector may be the gyroscope bias as the rotation vector in the static case may be zero.

The IMU-to-RFU orientation 534 module/circuit/function and IMU-to-ENU orientation 536 module/circuit/function will be described hereinbelow.

The processing circuit 520 may also include, implement, or both, a non-flat surface detector 538 module/circuit/function. The non-flat surface detector 538 module/circuit/function may be configured to indicate if the vehicle transporting the first mobile device 500, is moving on a flat surface or a non-flat surface. According to some aspects, the non-flat surface detector 538 may provide an indication of a degree of flatness of the surface upon which the vehicle is moving. A more detailed description of a non-flat surface detector 538 is provided hereinbelow.

The processing circuit 520 may also include, implement, or both, an application program interface (API) (referred to hereinafter as API 537). The API 537 may be operationally coupled to the GNSS receiver 510, the INS 518, or both via a GNSS or INS selection module/circuit/function (not shown). The processing circuit 520 may determine whether the API 537 receives data from the GNSS receiver 510 or the INS 518. It is noted that the INS 518 receives data from both the GNSS receiver 510 and the IMU 512. Additional details regarding the API 537 and the GNSS or INS selection module/circuit/function (not shown) are provided hereinbelow.

The processing circuit 520 may still further include, implement, or both, a navigation system 539 module/circuit/function configured for various aspects, including, for example, locating a graphical representation of the first mobile device 500 on a displayed map, mapping a planned route for the first mobile device 500 on the displayed map, provisioning graphical and aural directions, rerouting a planned route based on receipt of data representative of traffic detours or slow traffic, and the like. The navigation system 539 may use the API 537 to interface with the GNSS receiver 510, the IMU 512, or both. Other aspects as known to those of skill in the art are within the scope of the disclosure.

The first mobile device 500 may also include a memory device 540. The memory device 540 of the first mobile device 500 may include instructions for performing general operations of the first mobile device 500 as well as specific instructions for operation of any of the subsystems 502 and the processing circuit 520. According to one aspect, the memory device 540 may include network communication interface instructions 542, GNSS instructions 544, IMU and/or INS instructions 546, motion-bias-orientation instructions 548, vehicle motion classifier instructions 550, non-vehicle motion detector instructions 552, parameter estimator instructions 554, non-flat surface detector instructions 556, API instructions 558, navigation system instructions 560, or any combination thereof. Additionally, the memory device 540 may include circuits for data storage 562 (e.g., random access memory, working memory) of the first mobile device 500.

The processing circuit 520 may be responsible for managing the bus 564 and general processing, including the execution of software stored on the computer-readable medium 566.

The software, when executed by the processing circuit 520, may cause the processing circuit 520 to perform any of the various functionalities and processes described herein, including without limitation the various functionalities and/or processes described in connection with FIGS. 12-23, for any module, circuit, function, device or any combination thereof. The computer-readable medium 566 and the memory device 540 may also be used for storing data that is manipulated by the processing circuit 520 when executing software.

One or more processors (e.g., processing circuit 520) may execute software. Software may be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 566. The computer-readable medium 566 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 566 may also include, by way of example, a carrier wave, a transmission line, and any other suitable medium for transmitting software and/or instructions that may be accessed and read by a computer. The computer-readable medium 566 may reside in the processing circuit 520, external to the processing circuit 520, or distributed across multiple entities including the processing circuit 520. The computer-readable medium 566 may be a computer program product. By way of example, a computer program product may include a computer-readable medium in packaging materials. Those of skill in the art will recognize how best to implement the described functionality presented throughout the disclosure depending on the application and the overall design constraints imposed on the overall system.

In one or more examples, the computer-readable medium 566 may include software configured for various functions. For example, the software may be configured to implement one or more of the functions described in relation to FIGS. 12-23.

According to one aspect, the computer-readable medium 566 may be a non-transitory machine-readable storage medium having one or more instructions stored thereon, which when executed by at least one processing circuit 520 of the first mobile device 500 causes the at least one processing circuit 520 to determine accelerometer bias of the plurality of accelerometers 514 of the first mobile device 500 based on output of the plurality of accelerometers 514, determine gyroscope bias of a plurality of gyroscopes 516 of the first mobile device 500 based on output of the plurality of gyroscopes 516, determine a first spatial relationship between a first frame of reference of the first mobile device 500 and a second frame of reference of a vehicle transporting the first mobile device 500, based on output of at least two of the GNSS receiver 510, the plurality of accelerometers 514, or the plurality of gyroscopes 516, determine a second spatial relationship between the first frame of reference of the first mobile device 500 and a third frame of reference of a surface beneath the vehicle, based on output of at least two of the GNSS receiver 510, the plurality of accelerometers 514, or the plurality of gyroscopes 516. The non-transitory machine-readable storage medium having one or more instructions stored thereon, which when executed by at least one processing circuit 520 of the first mobile device 500 may further cause the at least one processing circuit 520 to initialize the INS 518 of the first mobile device 500 by providing accelerometer bias, gyroscope bias, the first spatial relationship, and the second spatial relationship to the INS 518. The INS 518 may be provided with the accelerometer bias, the gyroscope bias, the first spatial relationship, and the second spatial relationship upon determining that the first mobile device 500 is stationary relative to the vehicle transporting the first mobile device 500.

Exemplary Second Mobile Device

Figure 6:
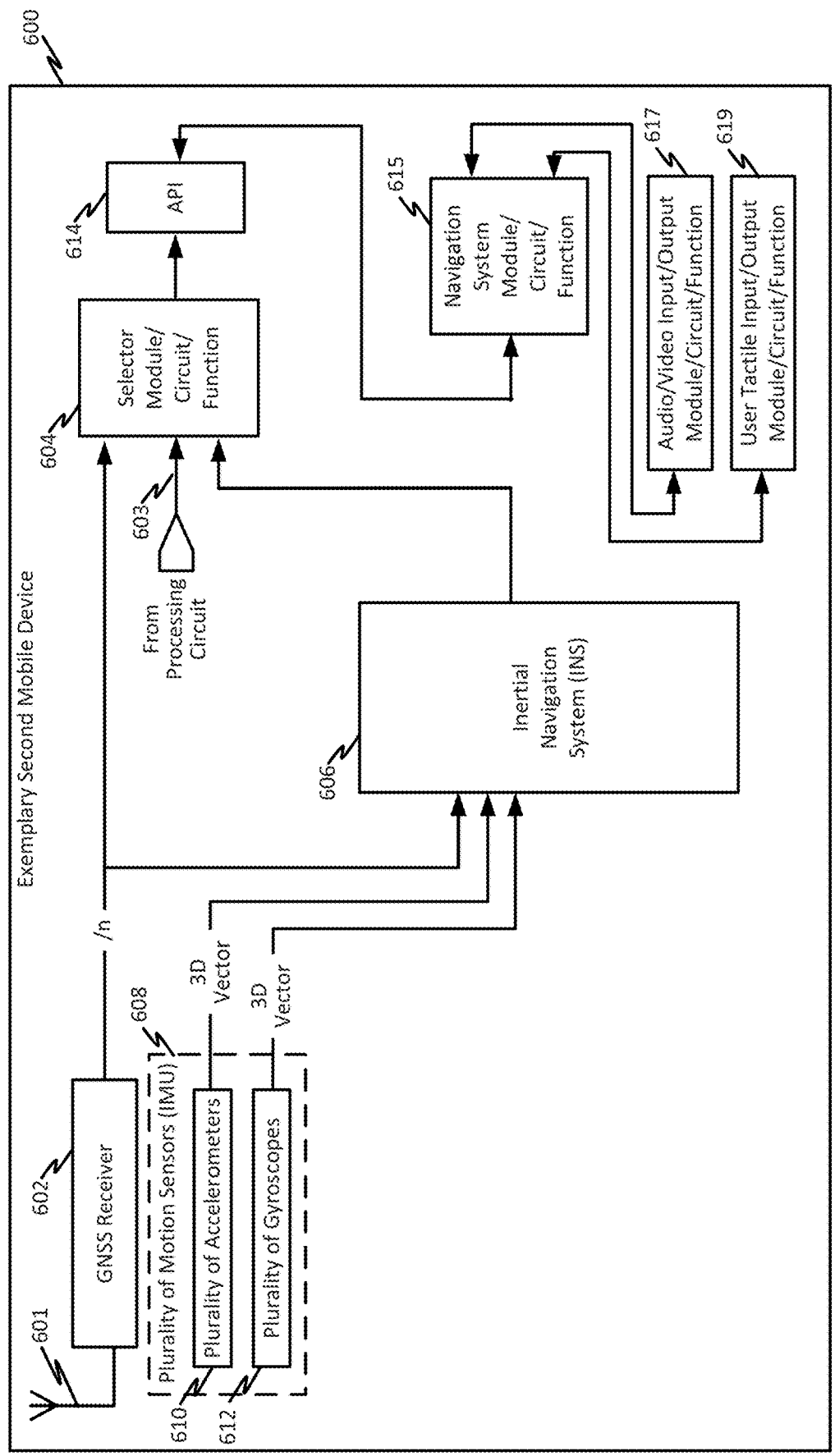
FIG. 6 is a simplified block diagram illustrating an exemplary implementation of a second mobile device.

FIG. 6 is a simplified block diagram illustrating an exemplary implementation of a second mobile device 600. The second mobile device 600 includes a global navigation satellite system receiver module/circuit/function, hereinafter referred to as the GNSS receiver 602. The GNSS receiver 602 may receive satellite signals from one or more antennas, represented in FIG. 6 as antenna 601. The GNSS receiver 602 is similar to the GNSS receiver 510 of FIG. 5.

The second mobile device 600 further includes a plurality of motion sensors, hereinafter referred to as an IMU 608. The IMU 608 may include a plurality of accelerometers 610 and a plurality of gyroscopes 612. The plurality of accelerometers 610 and the plurality of gyroscopes 612 have outputs communicatively coupled to an inertial navigation system (referred to hereinafter as INS 606). As depicted in FIG. 6, the output of the plurality of accelerometers 610 is a three-dimensional acceleration vector (e.g., an acceleration vector having components in the thee orthogonal directions of XYZ (FIG. 3, 302) in the IMU frame. The output of the plurality of gyroscopes 612 is a three-dimensional rotation vector (e.g., a rotation vector having components in the thee orthogonal directions of XYZ, or in pitch, roll, and yaw) (FIG. 3, 302) in the IMU frame.

The second mobile device 600 further includes an application program interface module/circuit/function, hereinafter referred to as API 614. As depicted, the INS 606 receives data from both the GNSS receiver 602 and the IMU 608. A processing circuit may provide a command, or may toggle a control line 603, to select, for input to the API 614, either the output of the GNSS receiver 602 or the output of the INS 606. The switching between the output of the GNSS receiver 602 and the INS 606 may be performed by the selector 604 module/circuit/function.

The API 614 may be operationally coupled to a navigation system 615 module/circuit/function. The navigation system 615 module/circuit/function may be operationally coupled to an audio/video input/output 617 module/circuit/function and a user tactile 619 input/output module/circuit/function. Aspects of the navigation system 615 module/circuit/function, the audio/video input/output 617 module/circuit/function, and the user tactile 619 input/output module/circuit/function were previously described and will not be repeated for the sake of conciseness.

The API 614 may receive data from the GNSS receiver 602 or data from the INS 606. There are methods to compute position and velocity using data from the GNSS receiver 602 alone and there are methods to compute position and velocity using data from the GNSS receiver 602, the plurality of accelerometers 610, and the plurality of gyroscopes 612. The API 614 may use the data from the GNSS receiver 602 as a default input. The data from the GNSS receiver 602 may be useful if data from the plurality of accelerometers 610 and data from the plurality of gyroscopes 612 is not available (but data from the GNSS receiver 602 is available). However, when data from the GNSS receiver 602, the plurality of accelerometers 610, and the plurality of gyroscopes 612 is available, that data may be applied to the INS 606. The output of the INS 606 may be more accurate and precise than data from the GNSS receiver 602 alone. However, as time goes by, while the second mobile device 600 is being transported in a vehicle and is subjected to non-vehicle motion, the data from the INS 606 may become inaccurate. Initialization and/or re-initialization of the INS 606, when the second mobile device 600, is coupled with the vehicle, is desired, but unavailable in the second mobile device 600.

Exemplary Third Mobile Device

Figure 7:
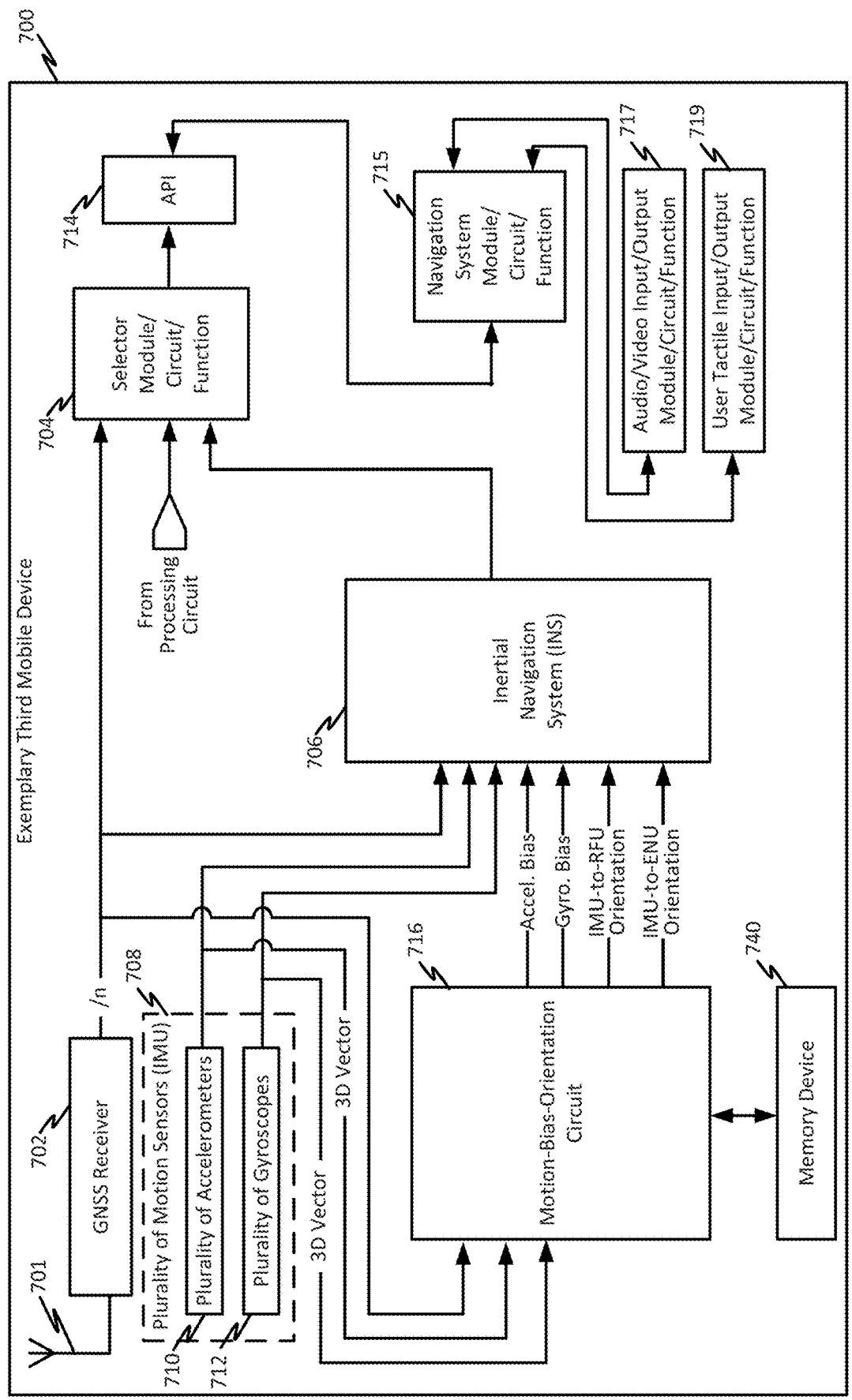
FIG. 7 is a simplified block diagram illustrating an exemplary implementation of a third mobile device, according to aspects described herein.

FIG. 7 is a simplified block diagram illustrating an exemplary implementation of a third mobile device 700, according to aspects described herein. The third mobile device 700 may be the same or similar to the mobile device 300 of FIG. 3, the first mobile device 500 of FIG. 5, and/or the fourth mobile device 800 of FIG. 8. The preceding list is exemplary and not limiting.

According to one aspect, the third mobile device 700 may include a global navigation satellite system (GNSS) receiver, referred to hereinafter as the GNSS receiver 702. GNSS receiver 702 and antenna 701 may be the same or similar to that of GNSS receiver 602 and antenna 601; accordingly, a detailed description will be omitted for the sake of conciseness.

The third mobile device 700 may further include a plurality of motion sensors, hereinafter referred to as an IMU 708. The IMU 708 may include a plurality of accelerometers 710 and a plurality of gyroscopes 712.

The third mobile device 700 may further include a motion-bias-orientation circuit 716. The motion-bias-orientation circuit 716 may be configured to determine motion of the third mobile device 700, bias of the plurality of accelerometers 710 (referred to herein as accelerometer bias), bias of the plurality of gyroscopes 712 (referred to herein as gyroscope bias), orientation of a first frame of reference of the third mobile device 700 relative to a second frame of reference of a vehicle (200, FIG. 2) coupled with the third mobile device 700 (referred to herein as an IMU-to-RFU orientation), and orientation of the first frame of reference of the third mobile device 700 relative to a third frame of reference of a surface (e.g., a surface of the Earth) beneath the vehicle (referred to herein as an IMU-to-ENU orientation). The determinations may be based on data received from the GNSS receiver 702, the plurality of accelerometers 710, the plurality of gyroscopes 712, or any combination thereof. The first, second, and third frames of reference were discussed above in connection with FIGS. 1, 2, 3, and 4 and will not be repeated for the sake of conciseness.

The third mobile device 700 may further include an inertial navigation system (INS) operationally coupled to the GNSS receiver 702, the plurality of accelerometers 710, the plurality of gyroscopes 712, the motion-bias-orientation circuit 716, or any combination thereof. The third mobile device 700 may be configured to initialize an inertial navigation system (referred to hereinafter as INS 706) by providing the INS 706 with accelerometer bias, gyroscope bias, the IMU-to-RFU orientation, and the IMU-to-ENU orientation. The INS 706 may be provided with the accelerometer bias, the gyroscope bias, the IMU-to-RFU orientation, and the IMU-to-ENU orientation upon determining that the third mobile device 700 has attained a state in which the motion of the third mobile device 700 is determined to be imparted to the third mobile device 700 by the vehicle (200) alone.

The plurality of accelerometers 710 and the plurality of gyroscopes 712 have outputs operationally coupled with the INS 706. As depicted, GNSS receiver 702 also has output operationally coupled to the INS 706. Also as depicted in FIG. 7, the output of the plurality of accelerometers 710 is a three-dimensional acceleration vector (e.g., an acceleration vector having components in the thee orthogonal directions of XYZ (FIG. 3, 302) in the IMU frame. The output of the plurality of gyroscopes 712 is a three-dimensional rotation vector (e.g., a rotation vector having components in the thee orthogonal directions of XYZ, or in pitch, roll, and yaw) (FIG. 3, 302) in the IMU frame.

The third mobile device 700 may further include a memory device 740, similar to memory device 540 (FIG. 5). The motion-bias-orientation circuit 716 may be operationally coupled to the GNSS receiver 702, the plurality of accelerometers 710, the plurality of gyroscopes 712, the memory device 740, or any combination thereof.

The motion-bias-orientation circuit 716 may use the data from the GNSS receiver 702, the plurality of accelerometers 710, and the plurality of gyroscopes 712 to determine parameters to provide to the INS 706. According to some aspects, the motion-bias-orientation circuit 716 may use the data from the GNSS receiver 702, the plurality of accelerometers 710, and the plurality of gyroscopes 712 to determine four parameters that are provided to the INS 706. As illustrated in FIG. 7, the four parameters may include accelerometer bias, gyroscope bias, the IMU-to-RFU orientation (e.g., coordinate translation, or IMU-to-RFU rotation matrix), and the IMU-to-ENU orientation (e.g., coordinate translation, or IMU-to-ENU rotation matrix). The four parameters were described above, and their descriptions, will not be repeated for the sake of conciseness, however, additional details regarding the operations implemented at the motion-bias-orientation circuit 716 to determine the four parameters will be provided hereinbelow.

The third mobile device 700 may include an application program interface an API 714, a selector 704 module/circuit/function, and a navigation system 715 module/circuit/function. The navigation system 715 module/circuit/function may be operationally coupled to an audio/video input/output 717 module/circuit/function and a user tactile 719 input/output module/circuit/function. Aspects of the API 714, the selector 704 module/circuit/function, the navigation system 715 module/circuit/function, the audio/video input/output 717 module/circuit/function, and the user tactile 719 input/output module/circuit/function were previously described and will not be repeated for the sake of conciseness.

According to one aspect, the third mobile device 700 may include the GNSS receiver 702, the plurality of accelerometers 710, the plurality of gyroscopes 712, the inertial navigation system (INS 706) operationally coupled to the GNSS receiver 702, the plurality of accelerometers 710, and the plurality of gyroscopes 712, and a motion-bias-orientation circuit 716 operationally coupled to the GNSS receiver 702, the plurality of accelerometers 710, the plurality of gyroscopes 712, and INS 706. The motion-bias-orientation circuit 716 may be configured to determine accelerometer bias of the plurality of accelerometers 710 based on output of the plurality of accelerometers 710, determine gyroscope bias of the plurality of gyroscopes 712 based on output of the plurality of gyroscopes 712, determine a first spatial relationship between a first frame of reference of the third mobile device 700 and a second frame of reference of a vehicle transporting the third mobile device 700, based on output from at least two of the GNSS receiver 702, the plurality of accelerometers 710, or the plurality of gyroscopes 712, determine a second spatial relationship between the first frame of reference of the third mobile device 700 and a third frame of reference of a surface beneath the vehicle, based on output from at least two of the GNSS receiver 702, the plurality of accelerometers 710, or the plurality of gyroscopes 712. Additionally, motion-bias-orientation circuit 716 may be configured to initialize the INS 706 by providing the INS 706 with accelerometer bias, gyroscope bias, the first spatial relationship, and the second spatial relationship upon determining that the third mobile device 700 is stationary relative to the vehicle transporting the third mobile device 700.

Exemplary Fourth Mobile Device

Figure 8:
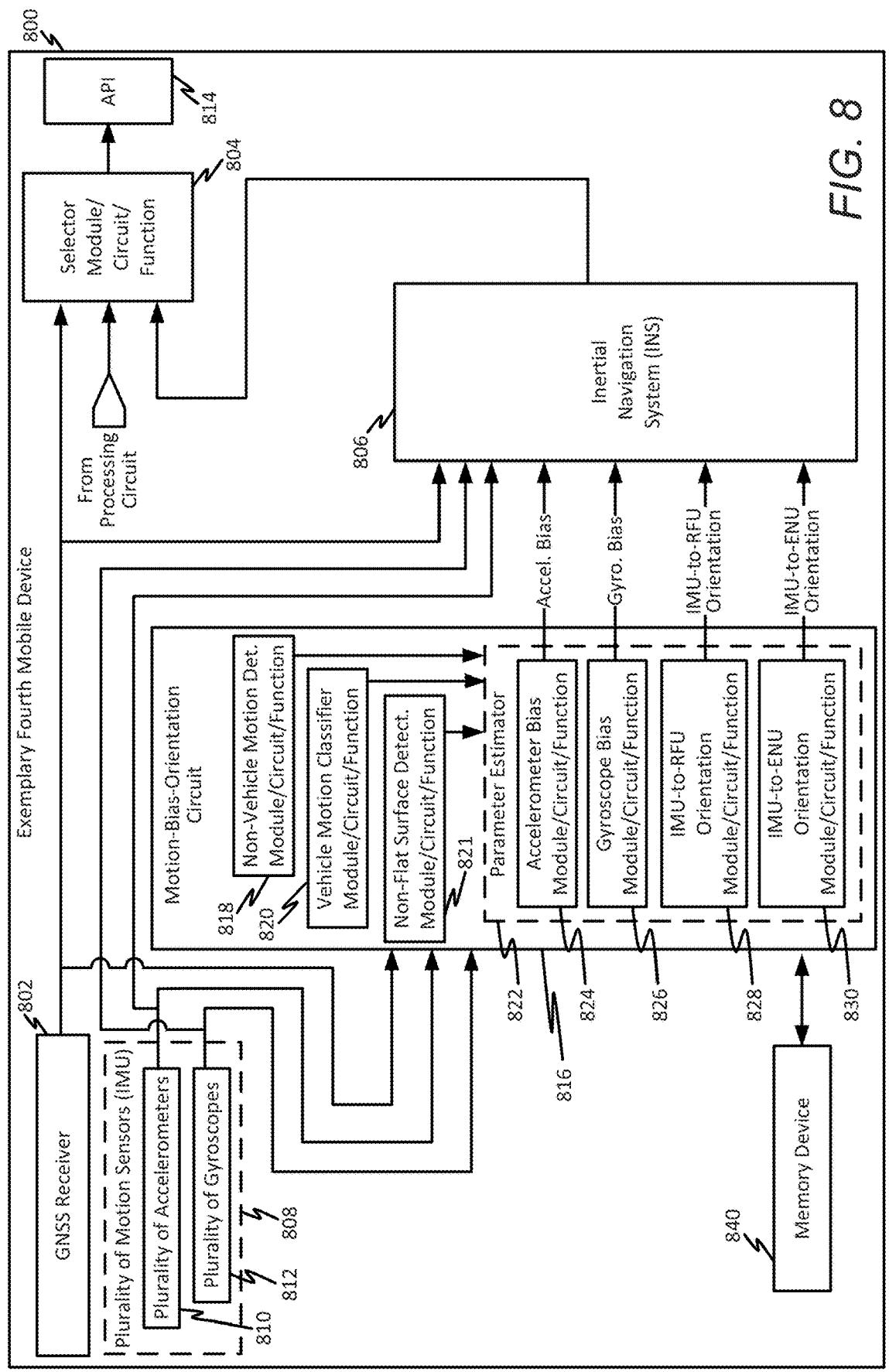
FIG. 8 is a simplified block diagram illustrating an exemplary implementation of a fourth mobile device, according to aspects described herein.

FIG. 8 is a simplified block diagram illustrating an exemplary implementation of a fourth mobile device 800, according to aspects described herein. The fourth mobile device 800 may be the same or similar to the mobile device 300 of FIG. 3, the first mobile device 500 of FIG. 5, and/or the third mobile device 700 of FIG. 7. The preceding list is exemplary and not limiting.

For example, the fourth mobile device 800 includes a global navigation satellite system receiver module/circuit/function, hereinafter referred to as the GNSS receiver 802. Antennae(s) of the GNSS receiver 802 were omitted to avoid cluttering the drawing. The GNSS receiver 802 is communicatively coupled to a selector 804 module/circuit/function and an inertial navigation system (INS) module/circuit/function, referred to hereinafter as INS 806.

The fourth mobile device 800 further includes a plurality of motion sensors, hereinafter referred to as an IMU 808. The IMU 808 may include a plurality of accelerometers 810 and a plurality of gyroscopes 812. The plurality of accelerometers 810 and the plurality of gyroscopes 812 have outputs communicatively coupled to the INS 806.

In addition to the GNSS receiver 802, the IMU 808 with the attendant plurality of accelerometers 810 and plurality of gyroscopes 812, the fourth mobile device may further include a memory device 840, similar to memory device 540 (FIG. 5), and a motion-bias-orientation circuit 816. The motion-bias-orientation circuit 816 may be operationally coupled to the memory device 840.

In addition to being operationally coupled to the selector 804, the output of the GNSS receiver 802 is further operationally coupled to the motion-bias-orientation circuit 816. Furthermore, in addition to being operationally coupled to the INS 806, the output of the first plurality of accelerometers 810 and the output of the plurality of gyroscopes 812 are further operationally coupled to the motion-bias-orientation circuit 816.

The motion-bias-orientation circuit 816 may include a non-vehicle motion detector 818 module/circuit/function, aspects of which will be described hereinbelow.

The motion-bias-orientation circuit 816 may further include a vehicle motion classifier 820 module/circuit/function, aspects of which will be described hereinbelow.

The motion-bias-orientation circuit 816 may further include a non-flat surface detector 821 module/circuit/function, aspects of which will be described hereinbelow.

The motion-bias-orientation circuit 816 may still further include a parameter estimator 822 module/circuit/function. The parameter estimator 822 module/circuit/function may include, for example, four sub module/circuits/functions. The four sub module/circuits/functions may be configured to determine four parameters. The four parameters and the sub-modules/circuits/functions may include accelerometer bias determined by an accelerometer bias 824 module/circuit/function, gyroscope bias determined by a gyroscope bias 826 module/circuit/function, an estimate of IMU-to-RFU orientation (e.g., coordinate translation or IMU-to-RFU rotation matrix) determined by an IMU-to-RFU orientation 828 module/circuit/function, and an estimate of IMU-to-ENU orientation (e.g., coordinate translation or IMU-to-ENU rotation matrix) determined by an IMU-to-ENU orientation 830 module/circuit/function.

The parameter estimator 822 module/circuit/function may be operationally coupled to, and receive data from, the GNSS receiver 802, the IMU 808 (or the plurality of accelerometers 810 and plurality of gyroscopes 812 of the IMU 808), or both. The parameter estimator 822 may use the data from the GNSS receiver 802, the plurality of accelerometers 810, and the plurality of gyroscopes 812 to determine, for example, four parameters that are provided to the INS 806. The parameter estimator 822 module/circuit/function may be operationally coupled to the INS 806 and may provide any combination of the four parameters to the INS 806. According to some aspects, the parameter estimator 822 module/circuit/function may be operationally coupled to the INS 806 and may provide the four parameters (or data representations thereof) to the INS 806.

The accelerometer bias 824 module/circuit/function may determine accelerometer bias of the plurality of accelerometers 810. Accelerometer bias may be due to the inexpensive and noisy nature of the accelerometers present in mobile devices. The accelerometer bias 824 module/circuit/function may determine accelerometer bias, $a_{bias}$, by determining that the fourth mobile device 800 is stationary, determining an acceleration vector, while the fourth mobile device 800 is stationary, from the plurality of accelerometers 810. In the static or stationary state, the measured accelerometer vector will be comprised of the gravity vector and accelerometer bias, and may be expressed according to the following equation:

$$a_{meas,stationary}^{IMU} = g_0 \hat{a}_{up} + a_{bias}$$

where $a_{meas,stationary}^{IMU}$ is a measured output of the plurality of accelerometers 810 of the IMU 808 when the fourth mobile device 800 is in a stationary state and may be referred to herein as a static acceleration vector, $g_0$ is the standard gravity (32.1740 ft/s$^2$ or 9.80665 m/s$^2$), $\hat{a}_{up}$ is a unit vector in the up direction (accordingly $g_0 \hat{a}_{up}$ is referred to herein as the gravity vector), and $a_{bias}$ is the accelerometer bias. The value of $a_{meas,stationary}^{IMU}$ and $a_{bias}$ may be stored in the memory device 840 of the of the fourth mobile device 800.

The gyroscope bias 826 module/circuit/function may determine gyroscope bias of the plurality of gyroscopes 812. Gyroscope bias may be due to the inexpensive and noisy nature of the gyroscopes present in mobile devices. Similar to the accelerometer bias 824 module/circuit/function, the gyroscope bias 826 module/circuit/function may determine the gyroscope bias by taking a static (non-moving or stationary) measurement of a rotation vector determined from the plurality of gyroscopes 812.

The gyroscope bias 826 module/circuit/function may determine gyroscope bias, $g_{bias}$, by taking a static (non-moving or stationary) measurement of the rotation vector determined from the plurality of gyroscopes 812. In the static or stationary state, the measured rotation vector may be comprised of the gyroscope bias:

$$g_{meas,stationary}^{IMU} = g_{bias}$$

where $a_{meas,stationary}^{IMU}$ is a measured output of the plurality of gyroscopes 812 of the IMU 808 when the fourth mobile device 800 is in a stationary state and $g_{bias}$ is gyroscope bias. The value of $g_{meas,stationary}^{IMU}$ and $g_{bias}$ may be stored in the memory device 840 of the fourth mobile device 800.

In order to determine an IMU-to-RFU orientation and an IMU-to-ENU orientation, the forward acceleration vector, right-forward acceleration vector, east acceleration vector and east-north acceleration vectors may first be determined Input from a GNSS receiver 802, the plurality of accelerometers 810, the plurality of gyroscopes 812, or any combination thereof may be used to determine the acceleration vectors. Data from the GNSS receiver 802 may, for example, indicate the direction of travel (e.g., straight-line, right-forward turning, north straight line, east-north turning) of the vehicle on the surface (e.g., the surface of the Earth). The plurality of gyroscopes 812 may indicate when the vehicle moves in a turn direction or in a straight-line direction, the plurality of accelerometers 810 may provide acceleration vectors when the vehicle is stationary, moving in the straight-line direction, moving in the turn direction.

To determine the forward acceleration vector (in a horizontal plane), the fourth mobile device 800 may cause a module, circuit, function, or any combination thereof to subtract the static acceleration vector from an acceleration vector measured while the vehicle is moving in the straight-line direction. While the vehicle is moving in the straight-line direction, the horizontal acceleration is the forward direction vector (because the vehicle is not turning and vehicles that are not turning are moving forward (or if in reverse then moving in the negative forward direction). Accordingly, the forward acceleration vector may be determined according to the following equation:

$$a_{forward}^{IMU} = a_{meas,forward}^{IMU} - a_{meas,stationary}^{IMU}$$

where $a_{forward}^{IMU}$ is the forward acceleration vector (in the horizontal plane), $a_{meas, forward}^{IMU}$ is the measured acceleration vector during motion in the straight-line direction, and $a_{meas, stationary}^{IMU}$ is the previously measured and stored value of the acceleration vector when the fourth mobile device 800 is stationary (i.e., the static acceleration vector).

To determine the right-forward acceleration vector (in a horizontal plane), the fourth mobile device 800 may cause a module, circuit, function, or any combination thereof to subtract the static acceleration vector from an acceleration vector measured while the vehicle is moving in a turn direction (e.g., a right-forward turn direction). In the scenario where the vehicle is moving in the right-forward turn direction, the horizontal acceleration is the right-forward direction vector (because the vehicle is not moving in a straight-line and vehicles that are not moving in a straight-line are moving in a turn). Accordingly, the right-forward acceleration vector may be determined according to the following equation:

$$a_{right-forward}^{IMU} = a_{meas,turn}^{IMU} - a_{meas,stationary}^{IMU}$$

where $a_{right-forward}^{IMU}$ is the right-forward acceleration vector (in the horizontal plane), $a_{meas, turn}^{IMU}$ is the measured acceleration vector during the turn, here the turn is in the right-forward turn direction, and $a_{meas, stationary}^{IMU}$ is the previously measured value of the acceleration vector when the fourth mobile device 800 is stationary (i.e., the static acceleration vector).

To determine the east acceleration vector (in a horizontal plane), the fourth mobile device 800 may cause a module, circuit, function, or any combination thereof to subtract the static acceleration vector from an acceleration vector measured while the vehicle is moving toward the east. While the vehicle is moving toward the east, the horizontal acceleration is the east direction vector (because the vehicle is moving in an east straight-line direction). Accordingly, the east acceleration vector may be determined according to the following equation:

$$a_{east}^{IMU} = a_{meas,east}^{IMU} - a_{meas,stationary}^{IMU}$$

where $a_{east}^{IMU}$ is the east acceleration vector (in the horizontal plane), $a_{meas,\ east}^{IMU}$ is the measured acceleration vector during the straight-line eastward motion, and $a_{meas,\ stationary}^{IMU}$ is the previously measured and stored value of the acceleration vector when the fourth mobile device 800 is stationary (i.e., the static acceleration vector).

To determine the east-north acceleration vector (in a horizontal plane), the fourth mobile device 800 may cause a module, circuit, function, or any combination thereof to subtract the static acceleration vector from an acceleration vector measured while the vehicle is moving in a turn direction (e.g., an east-north turn direction). While the vehicle is moving in the turn direction, the horizontal acceleration is the east-north direction vector (because the vehicle is not moving in a straight-line direction and vehicles that are not moving in a straight-line direction are moving in a turn direction). Accordingly, the east-north acceleration vector may be determined according to the following equation:

$$a_{east-north}^{IMU} = a_{meas,turn}^{IMU} - a_{meas,stationary}^{IMU}$$

where $a_{east-north}^{IMU}$ is the east-north acceleration vector (in the horizontal plane), $a_{meas,\ turn}^{IMU}$ is the measured acceleration vector in the east-north turn direction, and $a_{meas,\ stationary}^{IMU}$ is the previously measured and stored value of the acceleration vector when the fourth mobile device 800 is stationary (i.e., the static acceleration vector).

IMU-to-RFU and IMU-to-ENU Orientation Estimators

The IMU-to-RFU orientation 828 module/circuit/function and the IMU-to-ENU orientation 830 module/circuit/function are both coordinate translation estimators. The IMU-to-RFU orientation 828 module/circuit/function provides a coordinate translation or rotation from the IMU frame (302) of the mobile device (300, 500, 700, 800) to the RFU frame (202) of the vehicle (200). The IMU-to-ENU orientation 830 provides a coordinate translation or rotation from the IMU frame (302) of the mobile device (300, 500, 700, 800) to the ENU frame (102) of the surface beneath the vehicle (e.g., the tangent plane 106).

To determine an estimate of the IMU-to-RFU orientation, the IMU-to-RFU orientation 828 module/circuit/function may first determine the right-forward acceleration vector, $a_{Right-Forward}^{IMU}$, and the forward acceleration vector, $a_{forward}^{IMU}$, both in a horizontal plane. Next, the IMU-to-RFU orientation estimator may determine a cross product of the right-forward acceleration vector and the forward acceleration vector in order to determine an acceleration vector in the up direction, $a_{up}^{IMU}$. The IMU-to-RFU orientation 828 module/circuit/function may accordingly implement the following equation:

$$a_{up}^{IMU} = a_{right-forward}^{IMU} \times a_{forward}^{IMU}$$

Once the three vectors ($a_{up}^{IMU}$, $a_{right-forward}^{IMU}$, and $a_{forward}^{IMU}$) are known, the IMU-to-RFU orientation may be estimated with a set of Euler angles or Tait-Bryan angles, or a rotation matrix, or any other method that translates the coordinates of a set of three-dimensional vectors in a first orientation frame (e.g., the IMU frame) to a second orientation frame (e.g., the RFU frame). The subject of coordinate translation or rotation between frames of reference was discussed above in conjunction with FIG. 4 and will not be repeated for the sake of conciseness.

The IMU-to-ENU orientation 830 module/circuit/function may be configured in the same way as the IMU-to-RFU orientation 828 module/circuit/function, however, instead of being configured to operate on the IMU acceleration vectors represented in the RFU frame ($a_{up}^{IMU}$, $a_{right-forward}^{IMU}$, and $a_{forward}^{IMU}$), the IMU-to-ENU orientation 830 module/circuit/function is configured to operate on the IMU acceleration vectors represented in the ENU frame ($a_{up}^{IMU}$, $a_{east-north}^{IMU}$, $a_{north}^{IMU}$).

Similar to the second mobile device 600, and the third mobile device 700, the fourth mobile device 800 may include an API 814, a selector 804 module/circuit/function, a navigation system module/circuit/function (not shown). The navigation system module/circuit function, the audio/video input/output module/circuit/function are not shown to avoid cluttering the drawing, Aspects of the API 814, the selector 804 module/circuit/function, the navigation system module/circuit/function, the audio/video input/output module/circuit/function, and the user tactile input/output module/circuit/function were previously described and will not be repeated for the sake of conciseness.

Non-Vehicle Motion Detector Module/Circuit/Function

Figure 9:
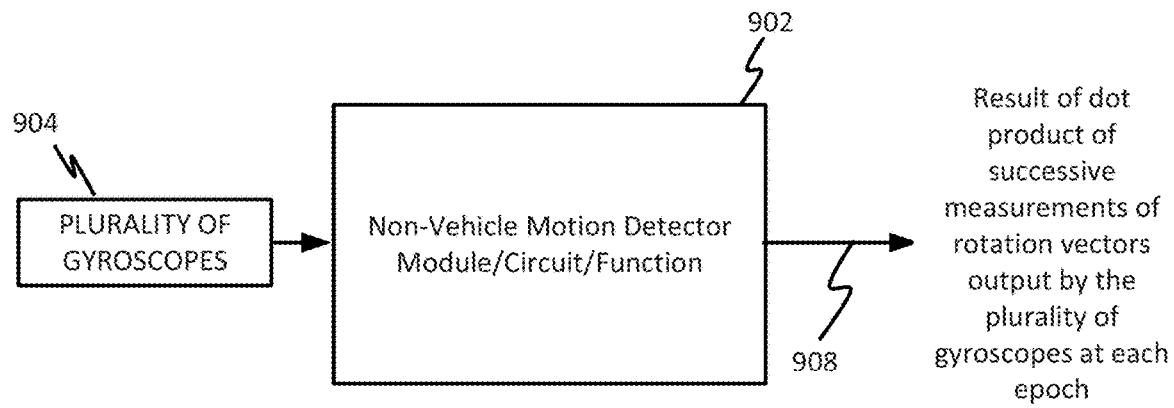
FIG. 9 is a block diagram representation of a non-vehicle motion detector module/circuit/function, according to aspects described herein.

FIG. 9 is a block diagram representation of a non-vehicle motion detector 902 module/circuit/function, according to aspects described herein. According to one aspect, the non-vehicle motion detector 902 module/circuit/function may be the same or similar to the non-vehicle motion detector 526 of FIG. 5. According to one aspect, the non-vehicle motion detector 902 circuit may be operationally coupled to a plurality of gyroscopes 904 and may be configured to classify motion of the mobile device according to both a first state in which motion of the mobile device includes non-vehicle motion and a second state in which motion of the mobile device is due to vehicle motion alone and determine that the mobile device is stationary relative to the vehicle transporting the mobile device when the motion of the mobile device is in the second state. In one aspect, the non-vehicle motion detector 902 may be operationally coupled to the plurality of gyroscopes 904 and may be exercised by the mobile device for and when classifying motion of the mobile device.

As described and exemplified above, initialization (or re-initializations) of the inertial navigation system (INS) may occur, for example, upon determining that the mobile device is stationary relative to the vehicle transporting the mobile device, or may occur when, for example, the non-vehicle motion detector 902 module/circuit/function detects that motion of the mobile device has changed from a first state in which motion of the mobile device is due to non-vehicle motion (e.g., motion imparted to the mobile device by a user holding the mobile device) to a second state in which motion of the mobile device is due to vehicle motion alone (e.g., in a state where the mobile device is stationary relative to the vehicle transporting the mobile device). The first state is different from the second state.

For ease of expression, an IMU-to-RFU orientation, previously described, may be hereinafter referred to as a first spatial relationship between a first frame of reference of the mobile device and a second frame of reference of a vehicle coupled to the mobile device (e.g., in a state in which the mobile device is stationary relative to the vehicle transporting the mobile device), or simply as a first spatial relationship. An IMU-ENU orientation, previously described, may be hereinafter referred to as a second spatial relationship between the first frame of reference of the mobile device and a third frame of reference of a surface beneath the vehicle, or simply as a second spatial relationship.

Accordingly, the mobile device, a processing circuit, a motion-bias-orientation circuit, or any combination thereof may initialize the INS by providing the INS with accelerometer bias, gyroscope bias, a first spatial relationship, and a second spatial relationship. The INS may be provided with the accelerometer bias, the gyroscope bias, the first spatial relationship, and the second spatial relationship upon a change of state from the first state to the second state, upon initial power up (if any of the four parameters previously discussed is available from a memory device of the mobile device), or upon determining that the mobile device is stationary relative to the vehicle transporting the mobile device. The mobile device, a processing circuit, a motion-bias-orientation circuit, or any combination thereof may be configured to re-determine the first spatial relationship, re-determine the second spatial relationship, and provide the INS with accelerometer bias, gyroscope bias, the re-determined first spatial relationship, and the re-determined second spatial relationship upon a subsequent change of state from the first state to the second state or upon subsequently determining that the mobile device is stationary relative to the vehicle transporting the mobile device. Re-determining the first spatial relationship and re-determining the second spatial relationship may be performed periodically. The period may be on the order of, or about, an epoch, or on the order of, or about, refresh intervals between successive measurements determined from the plurality of accelerometers, the plurality of gyroscopes, or both.

The non-vehicle motion detector 902 module/circuit/function may be configured to determine if a change of motion detected by the plurality of gyroscopes 904 between a first time and a later second time is due to vehicle motion (e.g., 200) (that is, the vehicle motion alone) or if the motion detected is due to motion of the mobile device (e.g., 300) independent from the vehicle 200 (that is, non-vehicle motion). A difference in time may be referred to as an epoch. As used herein, an epoch may be the time between successive gyroscope measurements or between successive refreshes of gyroscope data or between successive accelerometer measurements or between successive refreshes of accelerometer data, or any combination thereof. In one example an epoch may be one second; other lengths of epochs are within the scope of the disclosure.

If the rotation in degrees between epochs is greater than a predetermined number of degrees, then the rotation may not be due to vehicle motion as a vehicle, under normal operating conditions, may not rotate more than the predetermined number of degrees in one epoch. Accordingly, if there is a first rotation vector a=[x1, y1, z1] at time t=1 and a second rotation vector b=[x2, y2, z2] at time t=2, the non-vehicle motion detector 902 module/circuit/function may be configured to store the first rotation vector, a, at time t=1 and then determine a dot product of the two vectors by determining the second rotation vector, b, at time t=2, recalling the first rotation vector, a, from memory, and then determining the dot product of the two (a·b). The dot product of the two rotation vectors may be equal to ab cos $\theta$, where a is the norm of the magnitude of the first rotation vector, b is the norm of the magnitude of the second rotation vector, and is $\theta$ the angle between the first rotation vector and the second rotation vector as determined by the non-vehicle motion detector 902 during successive epochs. The maximum value of a·b will be ab when $\theta$=0 degrees (because the cosine of 0 degrees is 1). There is a range of a·b values that is reasonable for a vehicle. For example, with an epoch of about one second, a vehicle may rotate by 30 degrees or less, or by 10 degrees or less. The dot product of successive rotation vectors according to the 30-degree model will be 0.866 ab≤a·b≤ab and the dot product of successive rotation vectors according to the 10-degree model will be 0.984 ab≤a·b≤ab. Thus, if a·b is <0.866 ab for the $\theta$=30-degree model (e.g., $\theta$>30 degrees) or <0.984 ab for the $\theta$=10-degree model (e.g., $\theta$>10 degrees), then the motion detected may be due to non-vehicle motion applied to the mobile device.

Such non-vehicle motion may result from, for example, a user removing the mobile device from a cradle and rotating the mobile device toward the passenger window to take a photograph, the user removing the mobile device from a cup holder and raising the mobile device to an ear of the user, or from the mobile device dropping from a bracket coupled to the vehicle. The preceding lists are exemplary and non-limiting. The output 908 of the non-vehicle motion detector 902 may therefore be a result of a dot product of successive measurements of rotation vectors output by the plurality of gyroscopes 904 at each epoch, and may be used by the processing circuit to determine if the initialization or re-initialization of the INS, using the four previously described parameters, should take place. Initialization or re-initialization may occur when all detected motion is not non-vehicle motion. In other words, initialization or re-initialization may occur when the output 908 of the non-vehicle motion detector 902 is representative of a condition or state in which all detected motion is due to the vehicle motion alone.

Non-Flat Surface Detector Module/Circuit/Function

Figure 10:
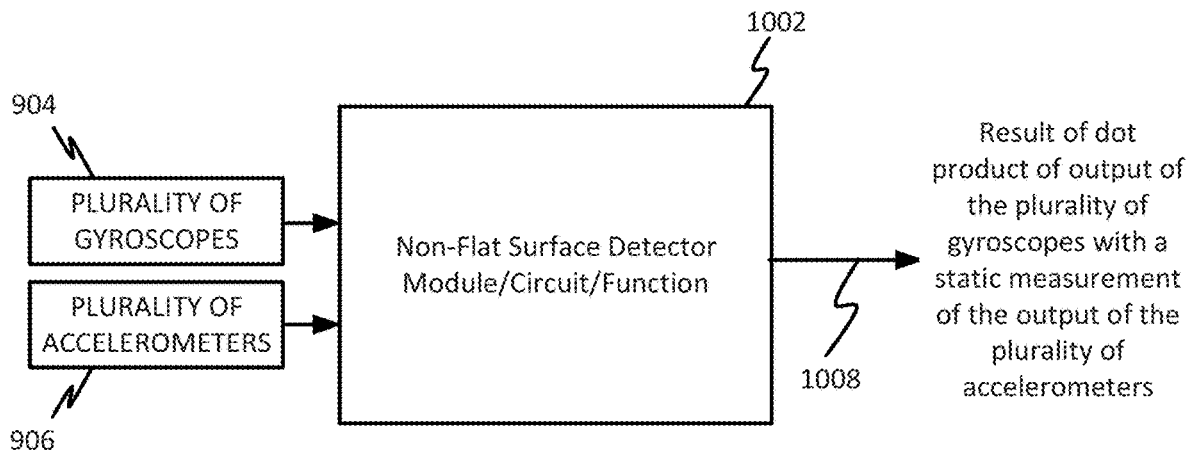
FIG. 10 is a block diagram representation of a non-flat surface detector module/circuit/function, according to aspects described herein.

FIG. 10 is a block diagram representation of a non-flat surface detector 1002 module/circuit/function, according to aspects described herein. The non-flat surface detector 1002 module/circuit/function may be the same or similar to the non-flat surface detector 538 module/circuit/function described in connection with FIG. 5 and the non-flat surface detector 821 module/circuit/function described in connection with FIG. 8.

The non-flat surface detector 1002 module/circuit/function may be implemented in a processing circuit, a stand-alone circuit, or a combination thereof. The non-flat surface detector 1002 module/circuit/function may receive input from the plurality of gyroscopes 904 and the plurality of accelerometers 906. The non-flat surface detector 1002 module/circuit/function may be configured to determine if the vehicle is moving on a non-flat surface, such as when a vehicle is in a banking turn. By way of example, when the vehicle is moving in a straight-line direction or a substantially straight-line direction on a horizontal plane (i.e., the surface is flat), the axis of rotation will be pointed up and will be generally aligned with the gravity vector. In a static measurement of the accelerometer, that is, a measurement of the accelerometer taken when the vehicle is not moving, the accelerometer is measuring the gravity vector. The static measurement of the accelerometer may be maintained in a memory of the mobile device. The angular difference, $\theta$, between the rotation vector and the static acceleration vector (i.e., the gravity vector) may be, for example 0≤$\theta$≤10 or 0≤$\theta$≤5 when the vehicle is moving on a flat surface.

The dot product of a rotation vector r=[xr, yr, zr] and a static acceleration vector a=[xa, ya, za] is ra cos $\theta$, where r is the norm of the magnitude of the rotation vector, a is the norm of the magnitude of the acceleration vector, and $\theta$ is angular difference between the rotation vector and the acceleration vector.

Accordingly, for the 10-degree model, 0.984 ra≤r·a≤ra and for the 5-degree model, 0.996 ra≤r·a≤ra. Thus, when r·a is <0.984 ra for the 10-degree model (e.g., θ greater than 10 degrees), or when r·a<0.996 ra for the 5-degree model (e.g., θ greater than 5 degrees), an output 1008 of the non-flat surface detector may therefore be a result of a dot product of the output of the plurality of gyroscopes 904 with a static measurement of the output of the plurality of accelerometers 906, and may be used to indicate that the vehicle is moving on a non-flat surface or non-horizontal surface (e.g., the vehicle is in a banking turn).

The non-flat surface detector may be configured to determine the angular difference between the static acceleration vector as measured using the plurality of accelerometers and a rotation vector as measured using the plurality of gyroscopes. Accordingly, the non-flat surface detector may be configured to provide the dot product of the static acceleration vector and a measured rotation vector ($r_{meas}^{IMU} \cdot a_{meas,stationary}^{IMU}$). If the dot product is less than a predetermined number (e.g. <0.984 ra) then the non-flat surface detector would indicate that the vehicle was not on a horizontal plane. Detection of when the vehicle is in a turn and when the vehicle is moving on a non-flat surface (e.g., a plane that is not a horizontal plane) may be useful as certain determinations made herein may be dependent upon whether the vehicle is in a turn, is moving on a horizontal plane, or both.

Forward Direction Estimator Module/Circuit/Function

Figure 11:
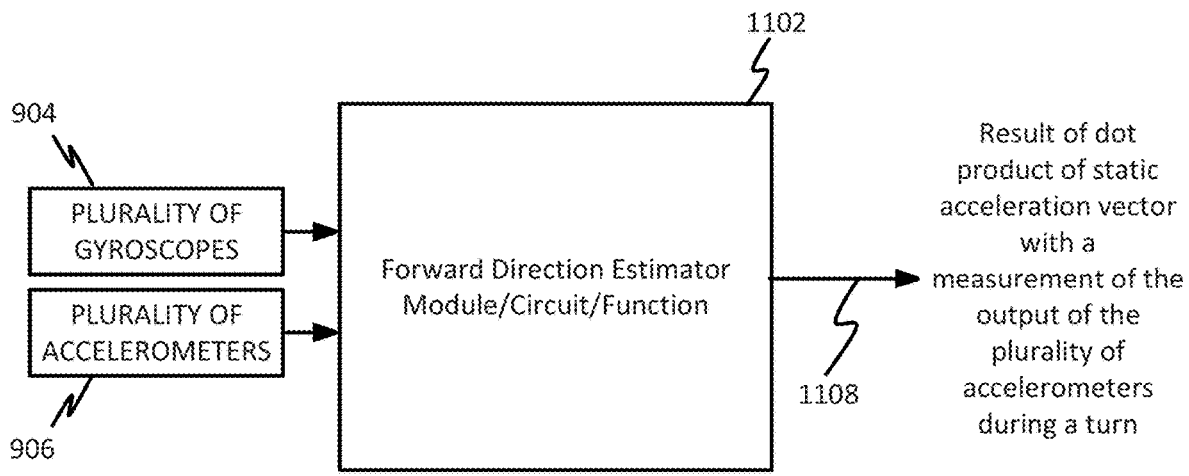
FIG. 11 is a block diagram representation of a forward direction estimator module/circuit/function, according to aspects described herein.

FIG. 11 is a block diagram representation of a forward direction estimator 1102 module/circuit/function, according to aspects described herein. The forward direction estimator 1102 module/circuit/function may be implemented in a processing circuit, a stand-alone circuit, or a combination thereof. The forward direction estimator 1102 module/circuit/function may receive input from the plurality of gyroscopes 904 and the plurality of accelerometers 906. The forward direction estimator 1102 module/circuit/function may be configured to indicate whether the vehicle is moving in the forward direction. Accordingly, the forward direction estimator 1102 module/circuit/function may be configured to determine a dot product of a static acceleration vector (e.g., an acceleration vector in a state in which the vehicle is stationary state) and a horizontal acceleration vector during a turn. The plurality of gyroscopes 904 may be used to indicate when the vehicle is in a turn.

The static acceleration vector (e.g., an acceleration vector in a state in which the vehicle is stationary state) may be measured and stored in a memory of the mobile device. The stationary state may be determined by monitoring the outputs of the plurality of accelerometers 906 and the plurality of gyroscopes 904. When the measurements of the plurality of gyroscopes 904 indicate that that the vehicle is moving in a straight-line direction, the forward direction estimator 1102 may not produce an output. When the measurements of the plurality of gyroscopes 904 indicate that that the vehicle is in a turn, the output 1108 of the forward direction estimator module/circuit/function may be the result of a dot product of the static acceleration vector (retrieved from memory) and the measured acceleration vector during the turn, which may be given by $$\text{Forward Direction} = a_{meas,turn}^{IMU} \cdot a_{meas,stationary}^{IMU}$$

where Forward Direction is a scalar, $a_{meas,turn}^{IMU}$ is the measured acceleration vector during a turn, and $a_{meas,stationary}^{IMU}$ is the previously measured and stored static acceleration vector.

Figure 12:
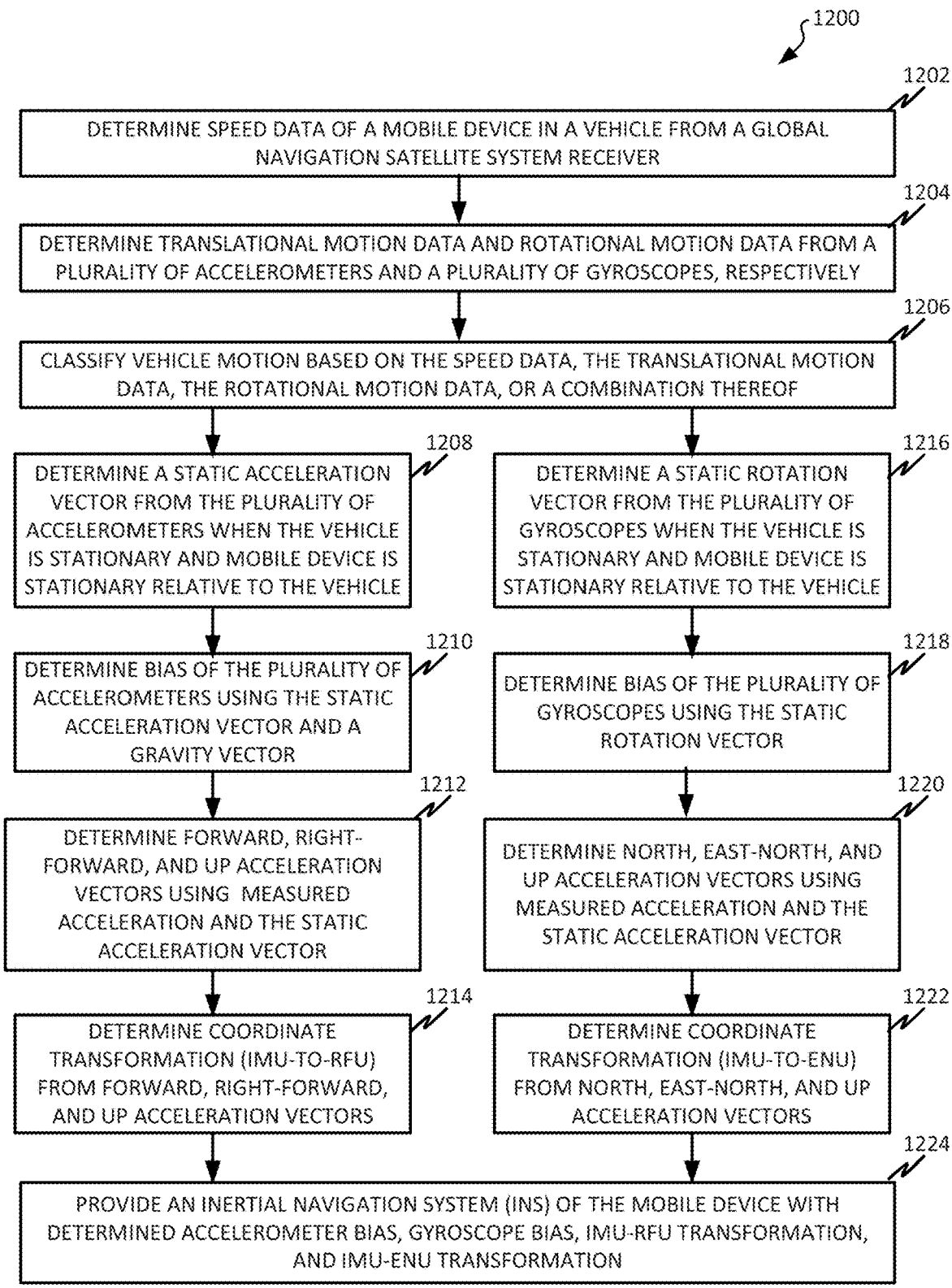
FIG. 12 is a flow diagram depicting a method of initializing or re-initializing an inertial navigation system of a mobile device with accelerometer bias data, gyroscope bias data, IMU-to-RFU orientation data, and IMU-to-ENU orientation data, operational at the mobile device, according to aspects described herein.

Exemplary Method of Initializing or Re-Initializing an Inertial Navigation System (INS) of a Mobile Device FIG. 12 is a flow diagram depicting a method 1200 of initializing or re-initializing an inertial navigation system of a mobile device with accelerometer bias data, gyroscope bias data, IMU-to-RFU orientation data (or first spatial relationship data), and IMU-to-ENU orientation data (or second spatial relationship data), operational at the mobile device, according to aspects described herein. The IMU-to-RFU orientation data may be envisioned as instructions for a coordinate frame translation from a first frame of reference of the mobile device (the IMU frame) to a second frame of reference of a vehicle (the RFU frame). The IMU-to-ENU orientation data may be envisioned as instructions for a coordinate frame translation from the first frame of reference of the mobile device (the IMU frame) to a third frame of reference of a surface beneath the vehicle (the ENU frame). The mobile device may be stationary relative to the vehicle transporting the mobile device in the IMU frame (e.g., non-vehicle motion is absent, any motion of the mobile device is due to the vehicle motion alone); however, the IMU frame and the ENU frame may not be aligned. Examples of the mobile device include the mobile device 300 of FIG. 3, 500 of FIG. 5, 700 of FIG. 7, and 800 of FIG. 8.

As previously discussed, motion of the mobile device being transported by the vehicle may be imparted to the mobile device by the vehicle motion alone (e.g., the mobile device is stationary relative to the vehicle transporting the mobile device) or may be imparted to the mobile device by a user (e.g., non-vehicle motion, motion imparted to the mobile device as the mobile device is handled by the user). According to some aspects, the method 1200 may be operational at the mobile device, a processing circuit of the mobile device, a motion-bias-orientation circuit of the mobile device, a parameter estimator circuit of the mobile device, an IMU-to-RFU orientation circuit of the mobile device, an IMU-to-ENU orientation circuit of the mobile device, or distributed through any combination thereof.

The method 1200 may begin with the mobile device determining speed data 1202 of the mobile device in the vehicle from a global navigation satellite system receiver (e.g., GNSS receiver 510, 702, and 802).

The mobile device may also determine translational motion data and rotational motion data 1204 from a plurality of accelerometers and a plurality of gyroscopes of the mobile device, respectively. The plurality of accelerometers 514 of FIG. 5, 710 of FIG. 7, and 810 of FIG. 8 are examples of pluralities of accelerometers. The plurality of gyroscopes 516 of FIG. 5, 712 of FIG. 7, and 812 of FIG. 8 are examples of pluralities of gyroscopes. The plurality of accelerometers and plurality of gyroscopes may provide data in a form of three-dimensional vectors (acceleration vectors and rotation vectors in three-dimensional space).

The mobile device may classify vehicle motion 1206 based on the speed data, the translational motion data, the rotational motion data, or any combination thereof. Classifications of vehicle motion may include motion in a straight-line direction, a turning direction in a plane, such as the turning direction in a right-forward plane (of the vehicle) or an east-north plane (of the surface of the Earth), non-flat motion, and stationary motion (which corresponds to no motion in any direction). The preceding list is exemplary and non-limiting.

The mobile device may determine a static acceleration vector from the plurality of accelerometers when the vehicle is stationary, and the mobile device is stationary relative to the vehicle transporting the mobile device 1208. In such a state, the motion of the mobile device is attributable to the vehicle motion alone (there is an absence of non-vehicle motion). The mobile device may determine the bias of the plurality of accelerometers using the static acceleration vector and a gravity vector 1210. Similarly, the mobile device may determine a static rotation vector from the plurality of gyroscopes when the vehicle is stationary, and the mobile device is stationary relative to the vehicle transporting the mobile device 1216. The mobile device may determine the bias of the plurality of gyroscopes using the static rotation vector 1218.

The mobile device may further determine a forward acceleration vector, a right-forward acceleration vector, and an up acceleration vector using additional measurements of acceleration vectors and the static acceleration vector 1212. The mobile device may determine a coordinate translation (e.g., a first orientation, a first spatial relationship) from the IMU frame to the RFU frame of the vehicle (also referred to as an IMU-to-RFU orientation) using the forward acceleration vector, the right-forward acceleration vector, and the up acceleration vector 1214. The coordinate translation may be expressed as a set of Euler angles or Tait-Bryan angles, or a rotation matrix, or any other coordinate translation representation know to those of skill in the art.

The mobile device may further determine a north acceleration vector, an east-north acceleration vector, and an up acceleration vector using additional measurements of acceleration vectors and the static acceleration vector 1220. The mobile device may determine a coordinate translation (e.g., a second orientation, a second spatial relationship) from the IMU frame to the ENU frame of a surface beneath the vehicle (also referred to as an IMU-to-ENU orientation) using the north acceleration vector, the east-north acceleration vector, and the up acceleration vector 1222. The IMU-to-RFU orientation and the IMU-to-ENU orientation may be expressed as a set of Euler angles or Tait-Bryan angles, a rotation matrix, or any other coordinate translation representation know to those of skill in the art.

The mobile device may provide an inertial navigation system (INS) of the mobile device with the determined accelerometer bias, gyroscope bias, IMU-to-RFU orientation (transformation), and the IMU-to-ENU orientation (transformation) to initialize or re-initialize the INS 1224.

The mobile device may determine that all or substantially all motion of the mobile device is due to the vehicle motion alone. In the state in which all or substantially all motion of the mobile device is due to the vehicle motion alone, the mobile device may be stationary relative to the vehicle transporting the mobile device and all motion imputed to the mobile device may be from the vehicle motion alone (e.g., there is no user imputed motion, no non-vehicle motion is detected). According to some aspects, the mobile device may provide the INS with the determined accelerometer bias, gyroscope bias, IMU-to-RFU orientation (transformation), and the IMU-to-ENU orientation (transformation) upon determining that all or substantially all motion of the mobile device is due to the vehicle motion alone.

According to some aspects, the INS may continue to function without a need of re-initialization while the mobile device is stationary relative to the vehicle transporting the mobile device (e.g., the mobile device is in a state in which non-vehicle motion would not be detected). Once non-vehicle motion is detected the mobile device may wait until the mobile device again detects that all or substantially all motion of the mobile device is due to the vehicle motion alone 1224 and again, the mobile device may initialize (re-initialize) the inertial navigation system (INS) of the mobile device by providing the INS with the determined accelerometer bias, gyroscope bias, determined (re-determined) IMU-to-RFU orientation, and determined (re-determined) IMU-to-ENU orientation 1226.

Exemplary IMU-to-RFU and IMU-to-ENU Orientation Methods

Figure 13:
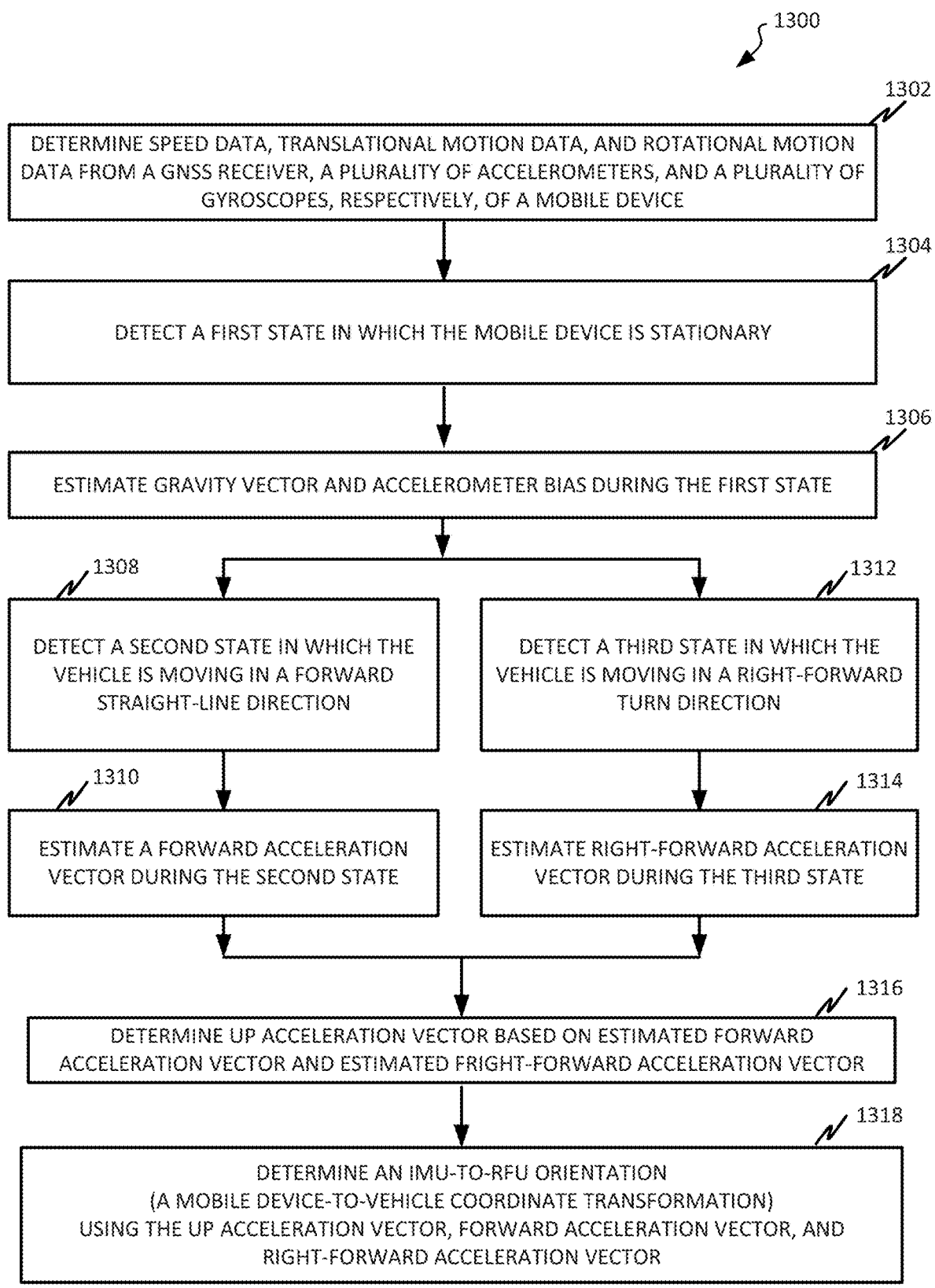
FIG. 13 is a flow diagram depicting a method of determining a mobile device-to-vehicle orientation (IMU-to-RFU orientation), operational at the mobile device, according to aspects described herein.

FIG. 13 is a flow diagram depicting a method 1300 of determining a mobile device-to-vehicle orientation (IMU-to-RFU orientation), operational in a mobile device, according to aspects described herein. According to some aspects, the method 1300 may be operational in the mobile device, in a processing circuit of the mobile device, in a motion-bias-orientation circuit of the mobile device, in a parameter estimator circuit of the mobile device, in an IMU-to-RFU orientation circuit of the mobile device, or distributed through any combination thereof.

To determine the IMU-to-RFU orientation, the mobile device may determine speed data, translational motion data, and rotational motion data from a GNSS receiver, a plurality of accelerometers, and a plurality of gyroscopes, respectively, of the mobile device 1302.

The mobile device may further detect a first state in which the mobile device is stationary 1304 (or in which the mobile device and the vehicle are stationary). Detection may be based on the speed data, the translational motion data, the rotational motion data, or any combination thereof. The first state in which the mobile device is stationary 1304 may exist when the speed data provided by the global navigation satellite system receiver indicates that the speed of the mobile device is zero. The first state in which the mobile device is stationary 1304 may exist when the translational motion data provided by the plurality of accelerometers indicates that no translational motion is present. The first state in which the mobile device is stationary 1304 may exist when the rotational motion data provided by the plurality of gyroscopes indicates that no rotational motion is present. The first state may be detected based on any combination of the preceding lists.

The mobile device may estimate a gravity vector and accelerometer bias 1306 during the first state. Accelerometer bias is understood to be a representation of the bias of each of the plurality of accelerometers of the mobile device. Accelerometer bias may be expressed as a three-dimensional vector. Accelerometer bias may be due to the quality of an inexpensive accelerometer used in the mobile device. According to one aspect the estimate of the gravity vector and accelerometer bias may be determined using the equation:

$$a_{meas,stationary}^{IMU} = g_0 \hat{a}_{up} = a_{bias}$$

where $a_{meas,stationary}^{IMU}$ is a measured output of the plurality of accelerometers of the IMU 808 when the mobile device is in a stationary state and may be referred to herein as a static acceleration vector, $g_0$ is the standard gravity (32.1740 ft/s² or 9.80665 m/s²), $\hat{a}_{up}$ is a unit vector in the up direction (accordingly $g_0 \hat{a}_{up}$ is referred to herein as the gravity vector), and $a_{bias}$ is the accelerometer bias. The value of $a_{meas,stationary}^{IMU}$ and $a_{bias}$ may be stored in the memory device of the of the fourth mobile device.

Subsequent to estimating the gravity vector and accelerometer bias 1306, the mobile device may detect a second state in which the vehicle is moving in a forward straight-line direction 1308. The second state may be based on the speed data, the translational motion data, the rotational motion data, or any combination thereof.

The mobile device may estimate a forward acceleration vector while the vehicle is moving in the forward straight-line direction 1310. The forward acceleration vector may be given by the equation:

$$a_{forward}^{IMU} = a_{meas,forward}^{IMU} - a_{meas,stationary}^{IMU}$$

where $a_{forward}^{IMU}$ is the forward acceleration vector (in a horizontal plane), $a_{meas,forward}^{IMU}$ is the measured forward acceleration vector, and $a_{meas,stationary}^{IMU}$ is the previously measured value of the acceleration vector when the mobile device is stationary (the static acceleration vector). The $a_{forward}^{IMU}$ vector is the acceleration vector, in the horizontal plane, in the IMU frame (also referred to as an IMU vector) that is pointing along the positive forward axis of the vehicle in the RFU frame.

Returning to 1306, subsequent to estimating the gravity vector and accelerometer bias 1306, the mobile device may detect a third state in which the vehicle is moving in a right-forward turn direction 1312 (e.g., forward and to the right with respect to the forward axis (see FIG. 2) of the vehicle). The detection of the third state of the mobile device may be based on the speed data, the translational motion data, the rotational motion data, or any combination thereof. According to one aspect, turning forward and to the right may be detected when there exists a non-zero value for translational motion along the forward axis and a non-zero value for rotational motion about the up axis of the vehicle, or may be detected using GNSS receiver data. According to some aspects, the right turning motion may exist in the right-forward plane. An estimate of the right-forward acceleration vector during the third state may be determined 1314. According to such an aspect, the estimate of the acceleration vector in the right-forward turn direction (of the third state) may be given by the equation:

$$a_{right-forward}^{IMU} = a_{meas,turn}^{IMU} - a_{meas,stationary}^{IMU}$$

where $a_{right-forward}^{IMU}$ is the right-forward acceleration vector during the right-forward turn (while the vehicle is moving in the horizontal plane), $a_{meas,turn}^{IMU}$ is the acceleration vector measured in the right-forward turn direction, and $a_{meas,stationary}^{IMU}$ is the previously measured value of the acceleration vector when the mobile device is stationary (the static acceleration vector). The acceleration vector measured during the right-forward turn, $a_{meas,turn}^{IMU}$, may be determined by waiting until the GNSS receiver, plurality of accelerometers, plurality of gyroscopes, or any combination thereof indicate that the vehicle is in a specified turn and then measure the acceleration vector during that turn. The vehicle should be turning in a horizontal plane (e.g., turning on a flat surface). A non-flat surface detector (which may be the same or similar to the non-flat surface detector 538 of FIG. 5, 821 of FIG. 8, and 1002 of FIG. 10) may be used to determine if the vehicle is moving on a flat surface. The $a_{Right-Forward}^{IMU}$ vector, in the horizontal plane, is a vector in the IMU frame that is pointing in the right-forward turn direction of the vehicle in the RFU frame.

The mobile device may determine an up acceleration vector based on the estimated accelerometer vector and the estimated forward acceleration vector and estimated right-forward acceleration vector 1316. According to some aspects, the right-forward acceleration vector and the forward acceleration vector always lie in a plane (the horizontal plane) and the up acceleration vector is a vector perpendicular to the plane (the up acceleration vector is a vector that is orthogonal to the plane). Thus, the up vector may be given by the equation:

$$a_{up}^{IMU} = a_{right-forward}^{IMU} \times a_{forward}^{IMU}$$

where $a_{up}^{IMU}$ is the up acceleration vector which is equal to the cross product between $a_{right-forward}^{IMU}$ and $a_{forward}^{IMU}$, where $a_{right-forward}^{IMU}$ is the previously estimated right-forward acceleration vector and $a_{forward}^{IMU}$ is the previously estimated forward acceleration vector. The $a_{up}^{IMU}$ vector is a vector in the IMU frame that is pointing orthogonally in the up direction in the RFU frame.

There is an alternative method of determining an up acceleration vector. The up acceleration vector is understood to be pointing in the up direction of the vehicle (e.g., in the direction of a unit vector pointing in a positive direction along the up axis of the vehicle). The alternative method is to measure the static acceleration vector, as before. The static acceleration vector is fundamentally a measure of the gravity vector, which is the acceleration vector in a stationary state of the vehicle; therefore, the static acceleration vector may be used as the up acceleration vector. However, the alternative way of determining the up acceleration vector is not as accurate as the previously discussed method of determining the up acceleration vector.

The mobile device may continue and may determine the IMU-to-RFU orientation (that is, the mobile device-to-vehicle coordinate translation) using the up acceleration vector, the estimated forward acceleration vector, and the estimated right-forward acceleration vector 1318. The IMU-to-RFU orientation may be expressed as, for example, a set of Euler angles or Tait-Bryan angles, or a rotation matrix that may be used to reorient vectors in the IMU frame to the RFU frame.

Figure 14:
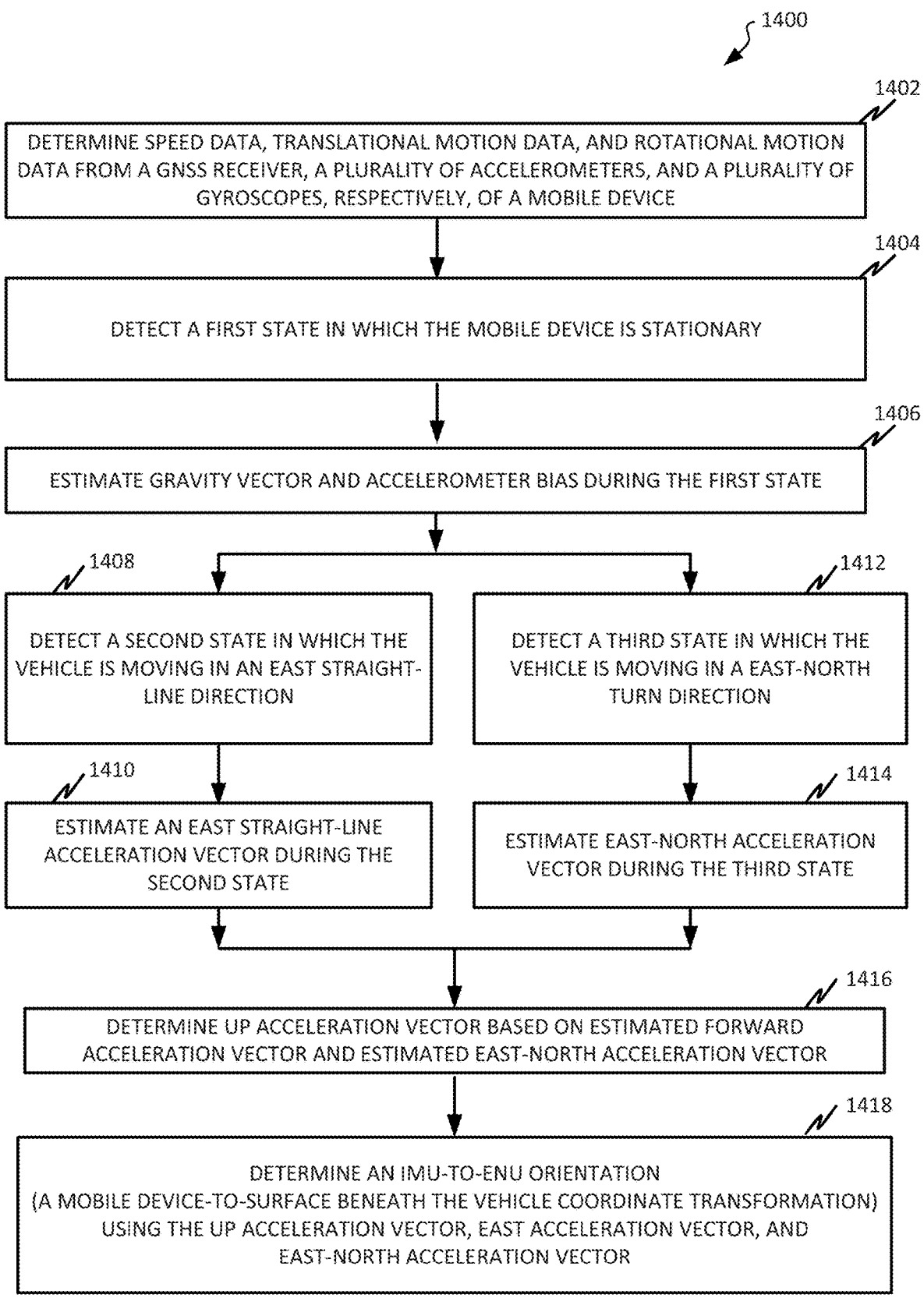
FIG. 14 is a flow diagram depicting a method of determining a mobile device-to-surface beneath the vehicle orientation (IMU-to-ENU orientation), operational at the mobile device, according to aspects described herein.

FIG. 14 is a flow diagram depicting a method 1400 of determining a mobile device-to-surface beneath the vehicle orientation (IMU-to-ENU orientation), operational at a mobile device, according to aspects described herein. According to some aspects, the method 1300 may be operational in the mobile device, in a processing circuit of the mobile device, in a motion-bias-orientation circuit of the mobile device, in a parameter estimator circuit of the mobile device, in an IMU-to-ENU orientation circuit of the mobile device, or distributed through any combination thereof.

To determine the IMU-to-ENU orientation, the mobile device may determine speed data, translational motion data, and rotational motion data from a GNSS receiver, a plurality of accelerometers, and a plurality of gyroscopes, respectively, of the mobile device 1402.

The mobile device may further detect a first state in which the mobile device is stationary 1404 (or in which the mobile device and the vehicle are stationary). Detection may be based on the speed data, the translational motion data, the rotational motion data, or any combination thereof. The first state in which the mobile device is stationary 1404 may exist when the speed data provided by the global navigation satellite system receiver indicates that the speed of the mobile device is zero. The first state in which the mobile device is stationary 1404 may exist when the translational motion data provided by the plurality of accelerometers indicates that no translational motion is present. The first state in which the mobile device is stationary 1404 may exist when the rotational motion data provided by the plurality of gyroscopes indicates that no rotational motion is present. The first state may be detected based on any combination of the preceding lists.

The mobile device may estimate a gravity vector and accelerometer bias 1406 during the first state. Accelerometer bias is understood to be a representation of the bias of each of the plurality of accelerometers of the mobile device. Accelerometer bias may be expressed as a three-dimensional vector. Accelerometer bias may be due to the quality of an inexpensive accelerometer used in the mobile device. According to one aspect the estimate of the gravity vector and accelerometer bias may be determined using the equation:

$$a_{meas,stationary}^{IMU} = g_0 \hat{a}_{up} + a_{bias}$$

where $a_{meas,stationary}^{IMU}$ is a measured output of the plurality of accelerometers of the IMU 808 when the mobile device is in a stationary state and may be referred to herein as a static acceleration vector, $g_0$ is the standard gravity (32.1740 ft/s² or 9.80665 m/s²), $\hat{a}_{up}$ is a unit vector in the up direction (accordingly $g_0 \hat{a}_{up}$ is referred to herein as the gravity vector), and $a_{bias}$ is accelerometer bias. The value of $a_{meas,stationary}^{IMU}$ and $a_{bias}$ may be stored in the memory device of the of the fourth mobile device.

Subsequent to estimating the gravity vector and accelerometer bias 1406, the mobile device may further detect a second state in which the vehicle is moving forward, by way of example, in an east straight-line direction 1408. The second state may be detected based on the speed data, the translational motion data, the rotational motion data, GNSS receiver data, or any combination thereof.

The mobile device may estimate an east straight-line acceleration vector while the vehicle is moving in the east straight-line direction 1410. The east straight-line acceleration vector may be given by the equation:

$$a_{east}^{IMU} = a_{meas,east}^{IMU} - a_{meas,stationary}^{IMU}$$

where $a_{east}^{IMU}$ is the east straight-line acceleration vector (in a horizontal plane) during east-straight-line motion, $a_{meas, east}^{IMU}$ is the measured east straight-line acceleration vector, and $a_{meas, stationary}^{IMU}$ is the previously measured value of the acceleration vector when the mobile device is stationary (the static acceleration vector). The $a_{east}^{IMU}$ vector is the acceleration vector, in the horizontal plane, in the IMU frame (also referred to as an IMU vector) that is pointing along the positive east axis of the vehicle in the ENU frame.

Returning to 1406, subsequent to estimating the gravity vector and accelerometer bias 1406, the mobile device may detect a third state in which the vehicle is moving in an east-north turn direction 1412 (north and to the east with respect to the north axis (see FIG. 1) of the surface beneath the vehicle). The detection of the third state of the mobile device may be based on the speed data, the translational motion data, the rotational motion data, GNSS receiver data, or any combination thereof. According to one aspect, turning north and to the east may be detected when there exists a non-zero value for translational motion along the north axis and a non-zero value for rotational motion about the up axis of the vehicle, or may be detected using GNSS receiver data. According to some aspects, the east turning motion may exist in the east-north plane. An estimate of the east-north acceleration vector during the third state may be determined 1414. According to such an aspect, the estimate of the acceleration vector in the east-north turn direction (of the third state) may be given by the equation:

$$a_{east-north}^{IMU} = a_{meas,turn}^{IMU} - a_{meas,stationary}^{IMU}$$

where $a_{east-north}^{IMU}$ is the east-north acceleration vector (in the horizontal plane) during the east-north turn motion $a_{meas, turn}^{IMU}$ is the acceleration vector measured in the east-north turn direction, and $a_{meas, stationary}^{IMU}$ is the previously measured value of the acceleration vector when the mobile device is stationary (the static acceleration vector). The acceleration vector measured during the east-north turn, $a_{meas, turn}^{IMU}$, may be determined by waiting until the GNSS receiver, plurality of accelerometers, plurality of gyroscopes, or any combination thereof indicate that the vehicle is in a specified turn and then measure the acceleration vector during that turn. The vehicle should be turning in a horizontal plane (e.g., turning on a flat surface). A non-flat surface detector (which may be the same or similar to the non-flat surface detector 538 of FIG. 5, 821 of FIG. 8, and 1002 of FIG. 10) may be used to determine if the vehicle is moving on a flat surface. The $a_{east-north}^{IMU}$ vector, in the horizontal plane, is a vector in the IMU frame that is pointing in the east-north turn direction of the vehicle in the ENU frame.

The mobile device may determine an up acceleration vector based on the estimated accelerometer vector and the estimated forward acceleration vector and estimated east-north acceleration vector 1416. According to some aspects, the east-north acceleration vector and the east acceleration vector always lie in a horizontal plane and the up acceleration vector is a vector perpendicular to the horizontal plane. Thus, the up vector may be given by the equation:

$$a_{up}^{IMU} = a_{east-north}^{IMU} \times a_{north}^{IMU}$$

where $a_{up}^{IMU}$ is the up acceleration vector which is equal to the cross product between $a_{east-north}^{IMU}$ and $a_{north}^{IMU}$, where $a_{east-north}^{IMU}$ is the previously estimated east-north acceleration vector and $a_{north}^{IMU}$ is the previously estimated north acceleration vector. The $a_{up}^{IMU}$ vector is a vector in the IMU frame that is pointing orthogonally in the up direction in the ENU frame.

The mobile device may determine the IMU-to-ENU orientation (that is, the mobile device-to-surface beneath the vehicle coordinate translation) using the up acceleration vector, the estimated north acceleration vector, and the estimated east-north acceleration vector 1418. The IMU-to-ENU orientation may be expressed as, for example, a set of Euler angles or Tait-Bryan angles, or a rotation matrix that may be used to reorient vectors in the IMU frame to the ENU frame.

Exemplary Method of Initializing an Inertial Navigation System (INS)

Figure 15:
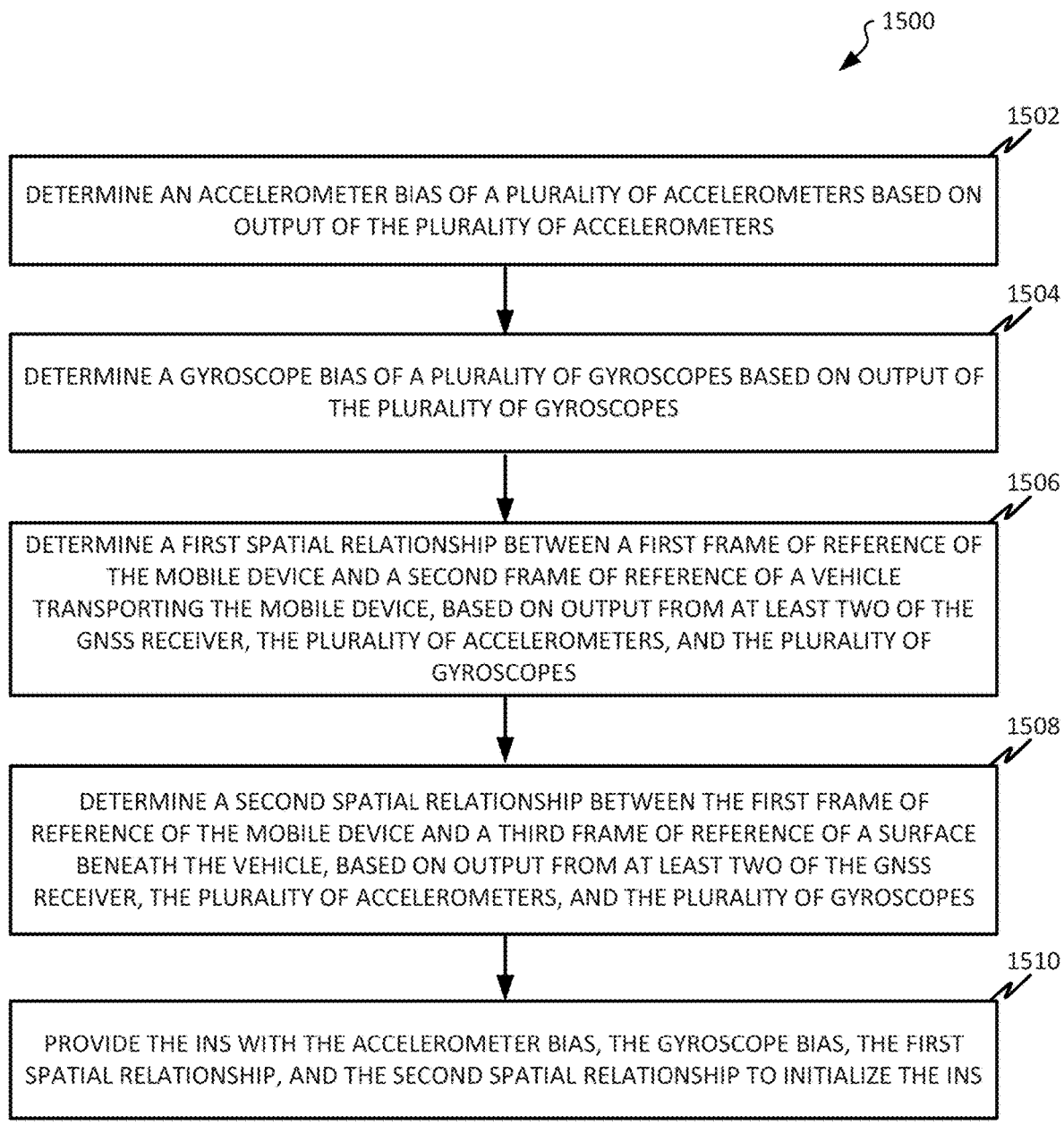
FIG. 15 is a flow diagram depicting a method of initializing an inertial navigation system (INS) of a mobile device, operational at the mobile device, according to aspects described herein.

FIG. 15 is a flow diagram depicting a method 1500 of initializing an inertial navigation system (INS) of a mobile device, operational at the mobile device, according to aspects described herein. The method 1500 may be operational at the mobile device. According to some aspects, the method 1500 may be operational at the mobile device during transport of the mobile device in a vehicle, operational at the mobile device. The mobile device may include a global navigation satellite system (GNSS) receiver, a plurality of accelerometers, a plurality of gyroscopes, an inertial navigation system (INS) operationally coupled to the GNSS receiver, the plurality of accelerometers, and the plurality of gyroscopes, and a motion-bias-orientation circuit operationally coupled to the GNSS receiver, the plurality of accelerometers, the plurality of gyroscopes, and INS. The mobile device, a processing circuit, the motion-bias-orientation circuit, or any combination thereof may be configured to perform the method 1500. The method 1500 may begin when the mobile device, the processing circuit, the motionbias-orientation circuit, or any combination thereof may determine accelerometer bias 1502 of the plurality of accelerometers based on output of the plurality of accelerometers (e.g., based on data output from the plurality of gyroscopes). The mobile device, the processing circuit, the motion-bias-orientation circuit, or any combination thereof may also determine gyroscope bias 1504 of the plurality of gyroscopes based on output from the plurality of gyroscopes (e.g., based on data output from the plurality of gyroscopes).

For ease of expression, an IMU-to-RFU orientation, previously described, may be hereinafter referred to as a first spatial relationship between a first frame of reference of the mobile device and a second frame of reference of a vehicle coupled to the mobile device, or simply as a first spatial relationship. An IMU-ENU orientation, previously described, may be hereinafter referred to as a second spatial relationship between the first frame of reference of the mobile device and a third frame of reference of a surface beneath the vehicle, or simply as a second spatial relationship.

The mobile device, the processing circuit, the motion-bias-orientation circuit, or any combination thereof may determine a first spatial relationship 1506 between a first frame of reference of the mobile device and a second frame of reference of a vehicle transporting the mobile device, based on output from at least two of the GNSS receiver, the plurality of accelerometers, or the plurality of gyroscopes. According to one aspect, the first spatial relationship may be based on data determined from the GNSS receiver, the plurality of accelerometers, the plurality of gyroscopes, or any combination thereof. The mobile device may determine a second spatial relationship 1508 between the first frame of reference of the mobile device and a third frame of reference of a surface beneath the vehicle, based on output from at least two of the GNSS receiver, the plurality of accelerometers, or the plurality of gyroscopes. According to one aspect the second spatial relationship may be based on data determined from the GNSS receiver, the plurality of accelerometers, the plurality of gyroscopes, or any combination thereof.

The first spatial relationship may be expressed as a first set of Euler angles, a first set of Tait-Bryan angles, or a first rotation matrix.

The second spatial relationship may be expressed as a second set of Euler angles, a second set of Tait-Bryan angles, or second rotation matrix.

Following the determining of accelerometer bias, gyroscope bias, the first spatial relationship, and the second spatial relationship, the mobile device, the processing circuit, the motion-bias-orientation circuit, or any combination thereof may provide the INS with the accelerometer bias, the gyroscope bias, the first spatial relationship, and the second spatial relationship to initialize (or re-initialize) the INS 1510. According to some aspects, the INS may be provided with the accelerometer bias, the gyroscope bias, the first spatial relationship, and the second spatial relationship upon determining that the mobile device is stationary relative to the vehicle transporting the mobile device. The mobile device, the processing circuit, the motion-bias-orientation circuit, or any combination thereof may make the determination that the mobile device is stationary relative to the vehicle transporting the mobile device. Additionally or alternatively, the mobile device, the processing circuit, the motion-bias-orientation circuit, or any combination thereof may determine if motion of the mobile device is due to non-vehicle motion (such as motion imparted to the mobile device by a user holding the mobile device in a hand of the user).

Figure 16:
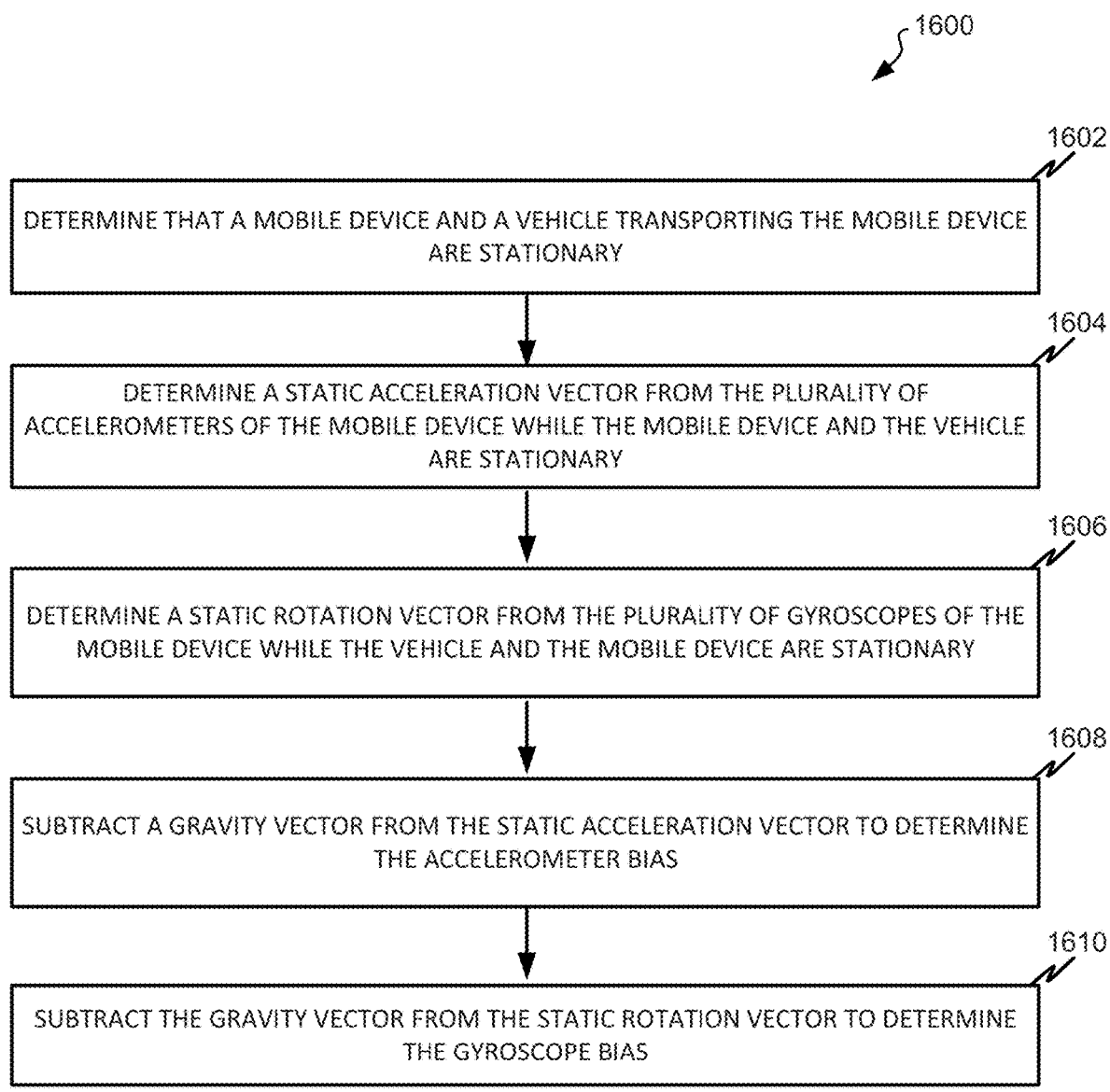
FIG. 16 is a flow diagram depicting a method of determining accelerometer bias of the plurality of accelerometers and determining gyroscope bias of the plurality of gyroscopes, operational at a mobile device, according to aspects described herein.

FIG. 16 is a flow diagram depicting a method 1600 of determining accelerometer bias of the plurality of accelerometers and determining gyroscope bias of the plurality of gyroscopes, operational at a mobile device, according to aspects described herein. The method 1600 may include determining that the mobile device and the vehicle (transporting the mobile device) are stationary 1602, the method 1600 may also include determining a static acceleration vector from the plurality of accelerometers (of the mobile device) while the vehicle and the mobile device are stationary 1604, the method 1600 may also include determining a static rotation vector from the plurality of gyroscopes (of the mobile device) while the vehicle and the mobile device are stationary 1606. The method 1600 may further include subtracting a gravity vector from the static acceleration vector to determine accelerometer bias 1608 and may include subtracting the gravity vector from the static rotation vector to determine gyroscope bias 1610.

FIG. 17 is a flow diagram depicting a method 1700 of determining that motion of the mobile device is due to the vehicle motion alone, operational at the mobile device, according to aspects described herein. The method 1700 method may begin when the mobile device determines an angle of a first rotation vector measured by the plurality of gyroscopes (of the mobile device) at a first time 1702. the mobile device may also determine an angle of a second rotation vector measured by the plurality of gyroscopes at a second time 1704. The mobile device may determine a difference in angular values and determine if the difference is less than a predetermined value 1706. The mobile device may determine that the motion of the mobile device is due to the vehicle motion alone if the difference between the angles is less than a predetermined value 1708 and the mobile device may determine that the motion of the mobile device is due to non-vehicle motion if the difference between the angles is greater than the predetermined value 1710. According to one aspect, the mobile device, a processing circuit, a motion-bias-orientation circuit, a non-vehicle motion detector circuit, or any combination thereof may be configured to determine a difference between angles of a first rotation vector measured by the plurality of gyroscopes at a first time and a second rotation vector measured by the plurality of gyroscopes at a second time, and indicate that the mobile device is in the second state if the difference between the angles is less than a predetermined value. According to one aspect, a difference in time between the first time and the second time may be a time between successive refreshes of data determined from the plurality of gyroscopes. According to one aspect, the predetermined value maybe 30 degrees or less, or may be 10 degrees or less.

FIG. 18 is a flow diagram depicting an alternative method 1800 of determining that motion of the mobile device is due to the vehicle motion alone, operational at the mobile device, according to aspects described herein. The alternative method 1800 may begin when the mobile device determines a first rotation vector measured by the plurality of gyroscopes (of the mobile device) at a first time 1802. The mobile device may determine a second rotation vector measured by the plurality of gyroscopes at a second time 1804. The mobile device may take the dot product of the first rotation vector and the second rotation vector 1806 and determine a result of the dot product. The mobile device may determine if the result is less than a predetermined value 1808. If the result is less than the predetermined value, the mobile device may determine that the motion of the mobile device is due to non-vehicle motion 1810. If the result is greater than the predetermined value the mobile device may determine motion of the mobile device is due to the vehicle motion alone 1812.

Figure 19:
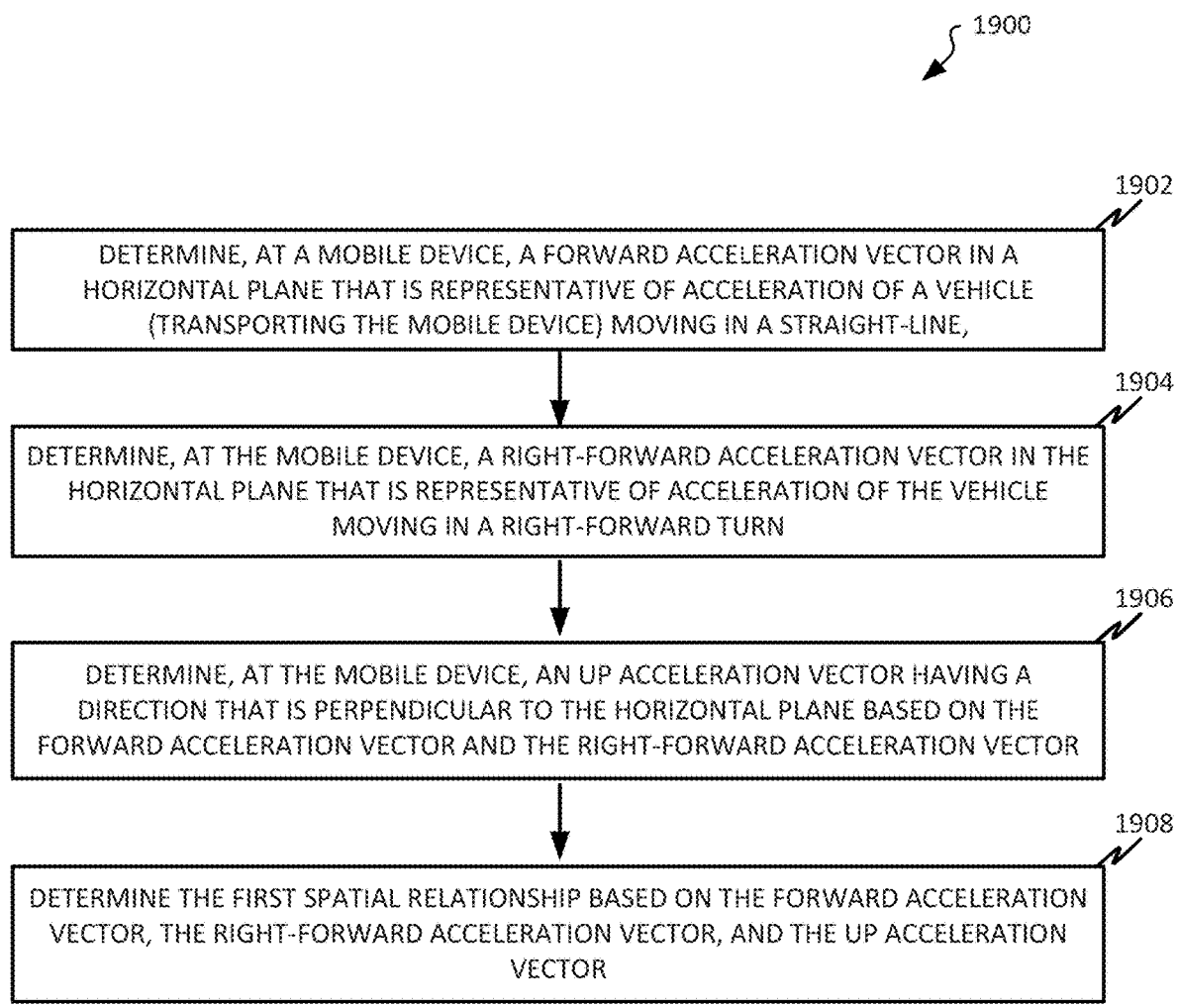
FIG. 19 is a flow diagram depicting a method of determining a first spatial relationship between a first frame of reference of a mobile device and a second frame of reference of the vehicle, operational at the mobile device, according to aspects described herein.

FIG. 19 is a flow diagram depicting a method 1900 of determining the first spatial relationship between a first frame of reference of a mobile device and a second frame of reference of a vehicle, operational at the mobile device, according to aspects described herein. The method 1900 may begin when the mobile device determines a forward acceleration vector 1902 in a horizontal plane that is representative of acceleration of the vehicle moving in a straight-line direction. The mobile device may also determine a right-forward acceleration vector 1904 in the horizontal plane that is representative of acceleration of the vehicle moving in a right-forward turn direction. The mobile device may determine an up acceleration vector 1906 having a direction that is perpendicular to the horizontal plane based on the forward acceleration vector and the right-forward acceleration vector. The mobile vehicle may also determine the first spatial relationship 1908 based on the forward acceleration vector, the right-forward acceleration vector, and the up acceleration vector.

According to some aspects, the first spatial relationship may be expressed as a set of Euler angles or Tait-Bryan angles, or a rotation matrix.

Figure 20:
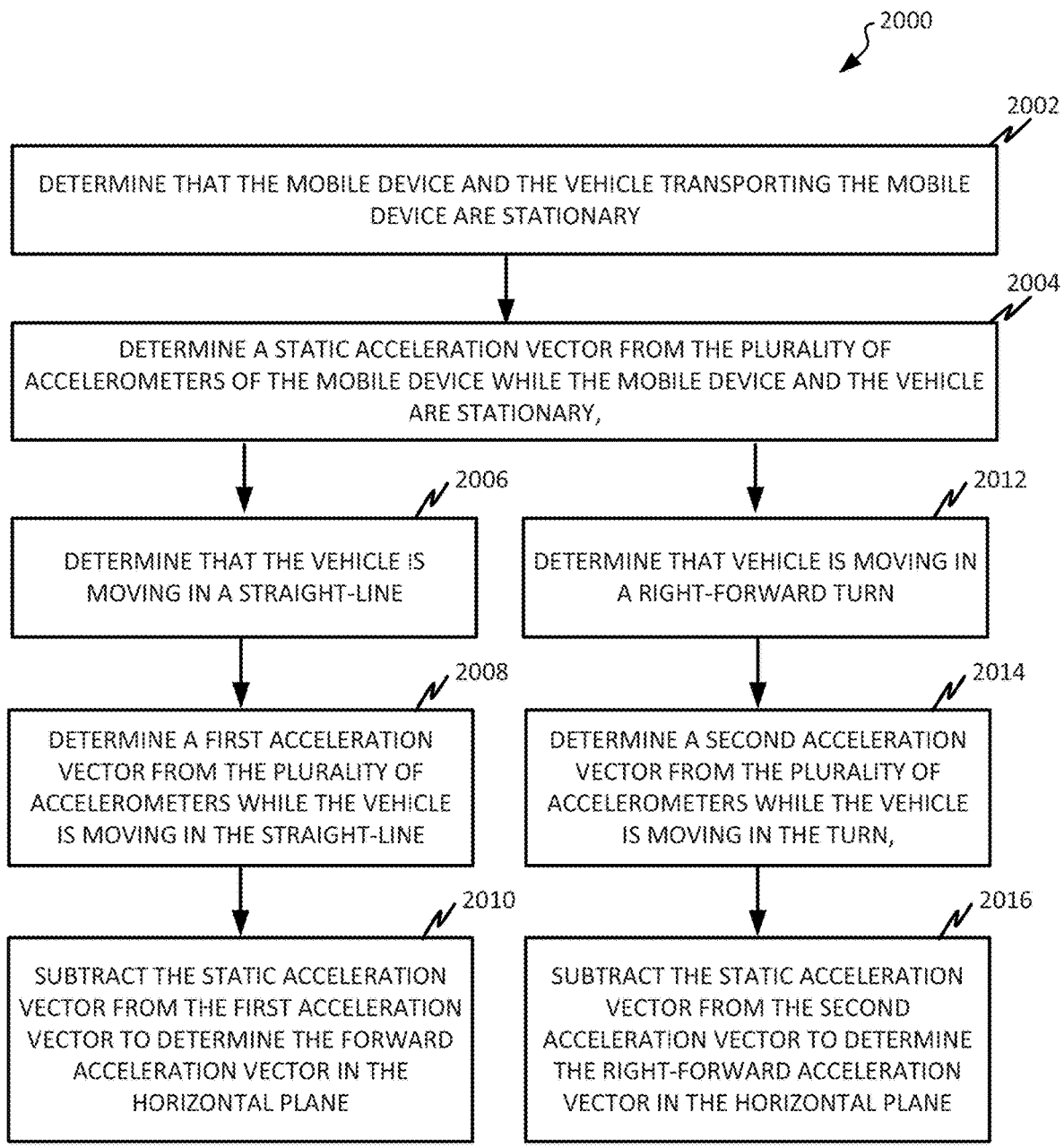
FIG. 20 is a flow diagram depicting a method of determining a forward acceleration vector in a horizontal plane that is representative of acceleration of a vehicle moving in a straight-line direction and determining a right-forward acceleration vector in the horizontal plane that is representative of the vehicle moving in a right-forward turn direction, the method operational at a mobile device, according to aspects described herein.

FIG. 20 is a flow diagram depicting a method 2000 of determining a forward acceleration vector in a horizontal plane that is representative of acceleration of a vehicle moving in a straight-line direction and determining a right-forward acceleration vector in the horizontal plane that is representative of the vehicle moving in a right-forward turn direction, the method operational at a mobile device, according to aspects described herein. The mobile device may first determine that the mobile device and the vehicle (transporting the mobile device) are stationary 2002. The mobile device may determine a static acceleration vector 2004 from a plurality of accelerometers (of the mobile device) while the mobile device and the vehicle are stationary. The mobile device may determine that the vehicle is moving in a straight-line direction 2006 and may determine a first acceleration vector 2008 from the plurality of accelerometers while the vehicle is moving in the straight-line direction. The mobile device may subtract the static acceleration vector from the first acceleration vector to determine the forward acceleration vector 2010 in the horizontal plane. The mobile device may also determine that the vehicle is moving in a right-forward turn direction 2012 and may determine a second acceleration vector 2014 from the plurality of accelerometers while the vehicle is moving in the right-forward turn direction. The mobile device may subtract the static acceleration vector from the second acceleration vector to determine the right-forward acceleration vector 2016 in the horizontal plane.

Figure 21:
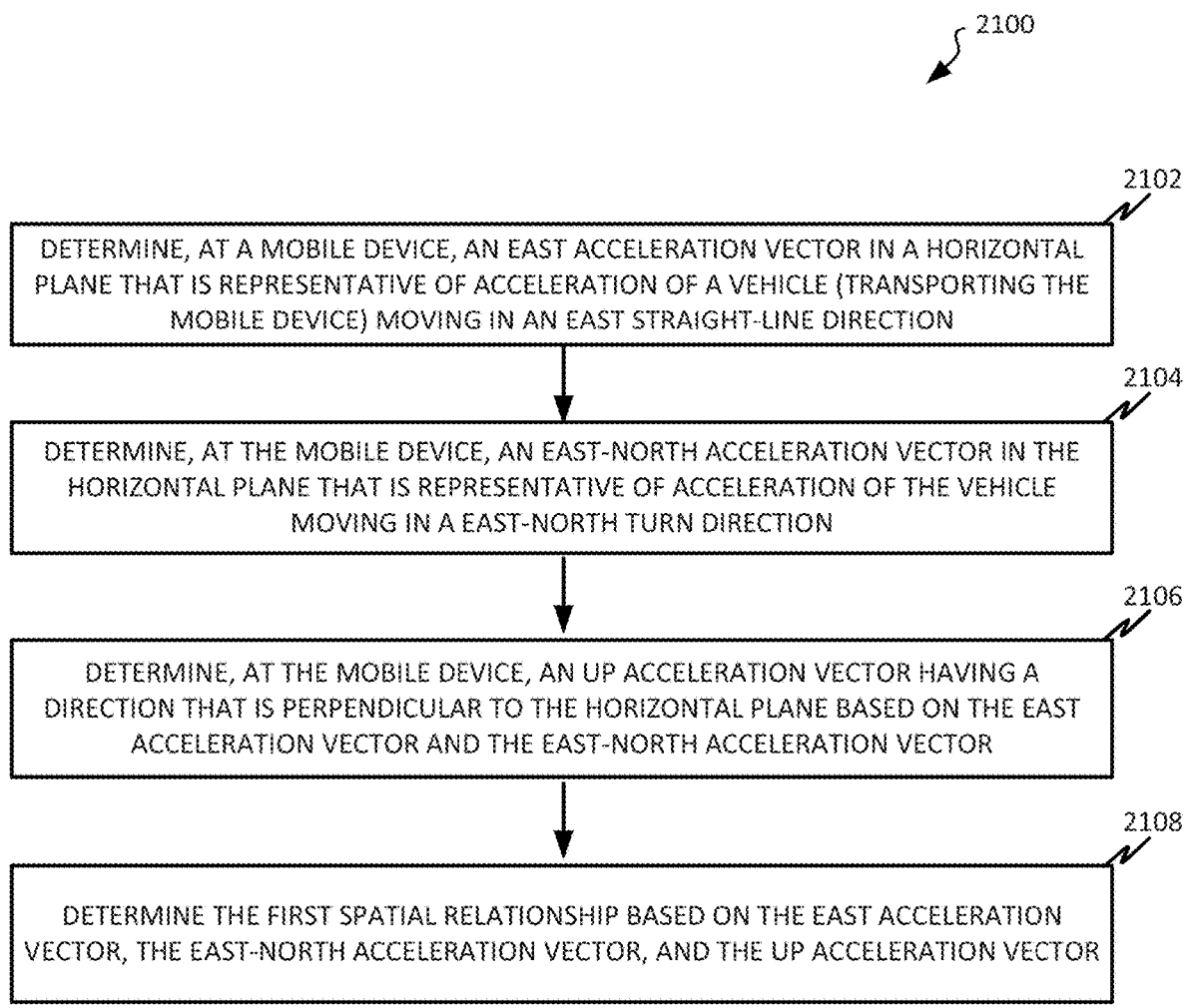
FIG. 21 is a flow diagram depicting a method of determining, at a mobile device, the second spatial relationship between a first frame of reference of the mobile device and a third frame of reference of a surface beneath a vehicle transporting the mobile device, operational at the mobile device, according to aspects described herein.

FIG. 21 is a flow diagram depicting a method 2100 of determining, at a mobile device, the second spatial relationship between a first frame of reference of the mobile device and a third frame of reference of a surface beneath a vehicle transporting the mobile device, operational at the mobile device, according to aspects described herein. The method 2100 may begin when the mobile device determines an east acceleration vector 2102 in a horizontal plane that is representative of acceleration of the vehicle moving in an east straight-line direction. The mobile device may determine an east-north acceleration vector 2104 in the horizontal plane that is representative of acceleration of the vehicle moving in an east-north turn direction. the mobile device may next determine an up acceleration vector 2106 having a direction that is perpendicular to the horizontal plane based on the east acceleration vector and the east-north acceleration vector. The mobile device may next determine the second spatial relationship 2108 from the east acceleration vector, the east-north acceleration vector, and the up acceleration vector.

According to some aspects, the second spatial relationship may be expressed as a set of Euler angles or Tait-Bryan angles, or a rotation matrix. Additionally, the mobile device may determine a direction of vehicle motion (e.g., north, east, east-north) based on data from the GNSS receiver.

Figure 22:
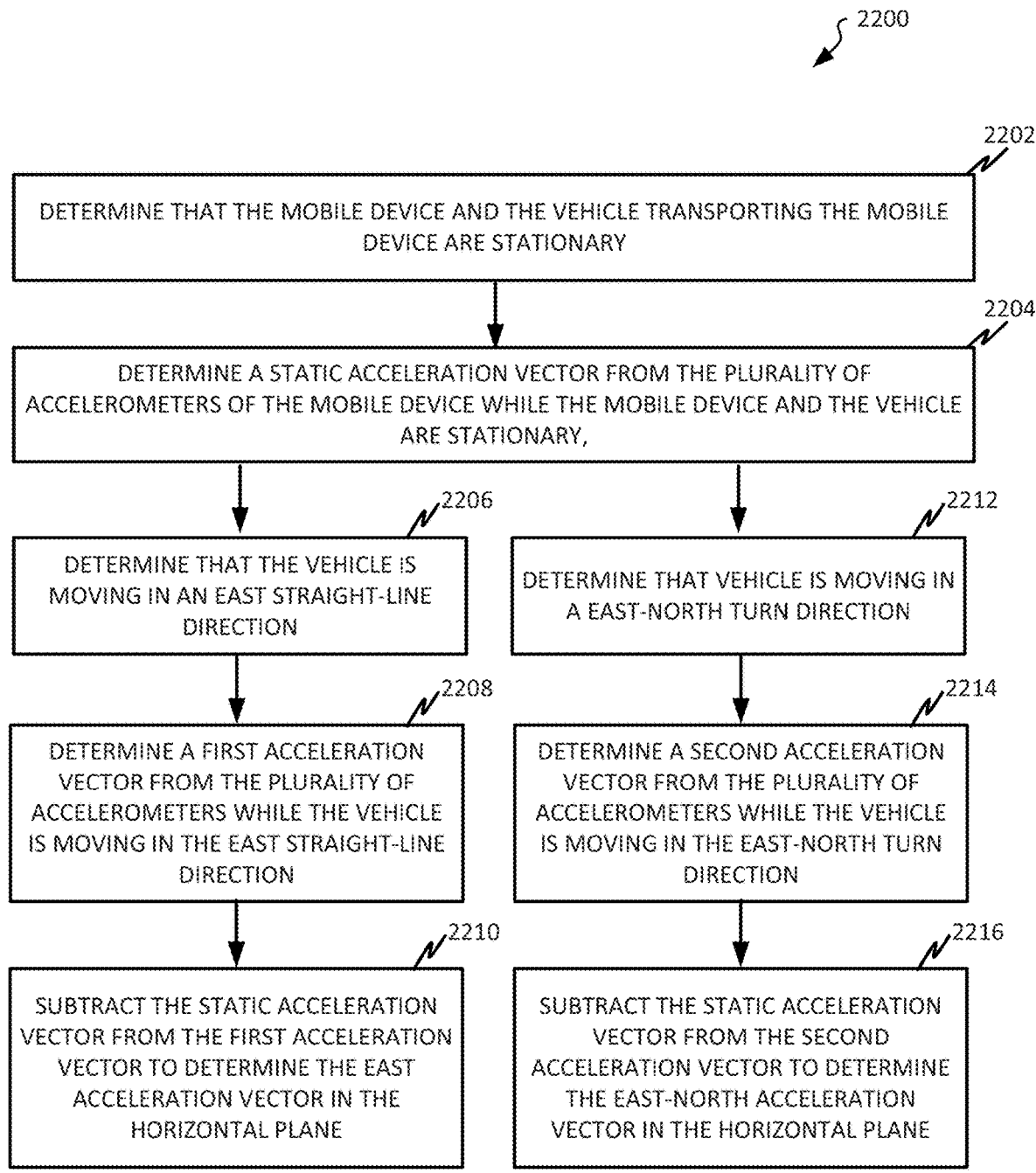
FIG. 22 is a flow diagram depicting a method of determining an east acceleration vector in a horizontal plane that is representative of acceleration of a vehicle moving in an east straight-line direction and determining an east-north acceleration vector in the horizontal plane that is representative of the vehicle moving in an east-north turn direction, operational at a mobile device, according to aspects described herein.

FIG. 22 is a flow diagram depicting a method 2200 of determining an east acceleration vector in a horizontal plane that is representative of acceleration of a vehicle moving in an east straight-line direction and determining an east-north acceleration vector in the horizontal plane that is representative of the vehicle moving in an east-north turn direction, operational at a mobile device, according to aspects described herein. The method 2200 may begin when the mobile device determines that the vehicle and the mobile device are stationary 2202. The mobile device may determine a static acceleration vector 2204 from a plurality of accelerometers while the vehicle and the mobile device are stationary. The mobile device may determine that the vehicle is moving in the east straight-line direction 2206. The mobile device may next determine a first acceleration vector 2208 from the plurality of accelerometers while the vehicle is moving in the east straight-line direction. The mobile device may then subtract the static acceleration vector from the first acceleration vector to determine the east acceleration vector in the horizontal plane 2210. The mobile device may further determine that the vehicle is moving in the east-north turn direction 2212 and may determine a second acceleration vector 2214 from the plurality of accelerometers while the vehicle is moving in the east-north turn direction. The mobile device may subtract the static acceleration vector from the second acceleration vector to determine the east-north acceleration vector in the horizontal plane 2216.

According to some aspects the mobile device may determine that the vehicle is moving on the horizontal plane using a non-flat surface detector configured to determine an angular difference between the static acceleration vector and a rotation vector as measured using the plurality of gyroscopes, and indicate that the vehicle is moving on a horizontal plane if the angular difference is less than a predetermined value.

The mobile device may determine the up acceleration vector having a direction that is perpendicular to the horizontal plane based on the forward acceleration vector and the right-forward acceleration vector by, for example, determining a cross product of the east-north acceleration vector and the east acceleration vector.

Exemplary Method Determining a Spatial Relationship

Figure 23:
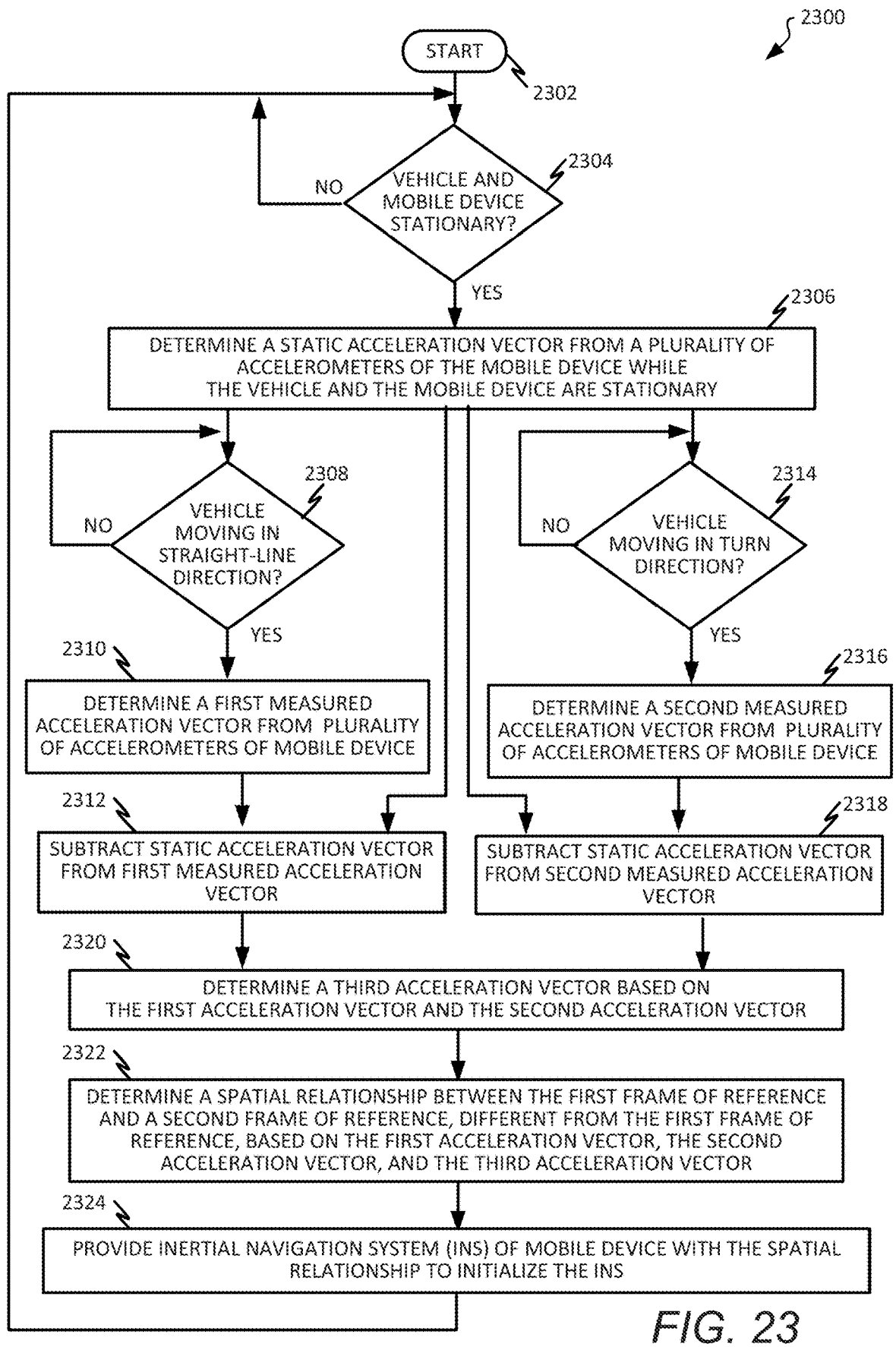
FIG. 23 is a flow diagram depicting a method of determining a spatial relationship between a first frame of reference of a mobile device and a second frame of reference (e.g., a translation from a first coordinate system to a second coordinate system), operational at the mobile device, according to aspects described herein.

FIG. 23 is a flow diagram depicting a method 2300 of determining a spatial relationship between a first frame of reference of a mobile device and a second frame of reference (e.g., a translation from a first coordinate system to a second coordinate system), operational at the mobile device, according to aspects described herein. The method 2300 may start at 2302. The mobile device may determine that a vehicle transporting the mobile device and the mobile device are stationary 2304. If the vehicle transporting the mobile device and the mobile device are not stationary, the method 2300 may return to 2304. If the vehicle transporting the mobile device and the mobile device are stationary, the mobile device may determine a static acceleration vector from a plurality of accelerometers of the mobile device while the vehicle and the mobile device are stationary 2306. The mobile device may also determine if the vehicle is moving in a straight-line direction in a second frame of reference, different from the first frame of reference 2308. If the vehicle is not moving in the straight-line direction in the second frame of reference, the method 2300 may return to 2308. If the vehicle is moving in the straight-line direction the mobile device may determine a first measured acceleration vector from the plurality of accelerometers while the vehicle is moving in the straight-line direction 2310. The mobile device may then subtract the static acceleration vector from the first measured acceleration vector to determine a first acceleration vector in a horizontal plane 2312.

The mobile device may also determine if the vehicle is moving in a turn direction in the second frame of reference 2314. If the mobile device determines that the vehicle is not moving in the turn direction, the method may return to 2314. If the mobile device determines that the vehicle is moving in the turn direction, the mobile device may determine a second measured acceleration vector from the plurality of accelerometers while the vehicle is moving in the turn direction 2316. The mobile device may then subtract the static acceleration vector from the second measured acceleration vector to determine a second acceleration vector in the horizontal plane 2318.

The mobile device may determine a third acceleration vector having a direction that is perpendicular to the horizontal plane based on the first acceleration vector and the second acceleration vector 2320. The mobile device may determine a spatial relationship between the first frame of reference and the second frame of reference based on the first acceleration vector, the second acceleration vector, and the third acceleration vector 2322.

The mobile device may provide an inertial navigation system (INS) of the mobile device with the spatial relationship to initialize (or re-initialize) the INS 2324. The mobile device may determine, subsequent to determining the spatial relationship, that motion of the mobile device is due to vehicle motion alone. According to some aspects, the spatial relationship may be provided to the INS upon determining that mobile device motion is due to the vehicle motion alone. According to other aspects, the mobile device may wait until a second spatial relationship between the first frame of reference and a third frame of reference, different from the first frame of reference and the second frame of reference, is determined and then may provide the INS with the spatial relationship and the second spatial relationship to initializes (or re-initialize) the INS. The spatial relationship and the second spatial relationship may be provided to the INS upon determining that motion of the mobile device is due to vehicle motion alone. According to still another aspect, the mobile device may provide the INS with accelerometer bias of the plurality of accelerators, gyroscope bias of a plurality of gyroscopes of the mobile device, the spatial relationship (e.g., a first spatial relationship), and the second spatial relationship to initialize the INS. Provision of the accelerometer bias of the plurality of accelerators, the gyroscope bias of the plurality of gyroscopes of the mobile device, the spatial relationship (e.g., a first spatial relationship), and the second spatial relationship may occur when the mobile device determines that motion of the mobile device is due to vehicle motion alone (e.g., because the mobile device is stationary relative to the vehicle).

According to one aspect, the spatial relationship may be expressed as a set of Euler angles or Tait-Bryan angles, or a rotation matrix.

According to another aspect, the first frame of reference may be an inertial measurement unit (IMU) frame of reference of the mobile device, and the second frame of reference may be: a right-forward-up (RFU) frame of reference of the vehicle, when the straight-line direction is along a forward axis of the RFU frame and the turn direction is in a right-forward direction of the RFU frame; or an east-north-up (ENU) frame of reference of a surface beneath the vehicle when the straight-line direction is along a north axis of the ENU frame and the turn direction is in an east-north turn direction of the ENU frame.

According to still another aspect, the mobile device may determine the straight-line direction and the turn direction using a global navigation satellite system (GNSS) receiver of the mobile device.

According to one aspect, the mobile device may determine that the vehicle is moving on the horizontal plane by determining an angular difference between the static acceleration vector and a rotation vector measured using a plurality of gyroscopes, and indicating that the vehicle is moving on the horizontal plane when the angular difference is less than a predetermined value.

Experimental Results

Figure 24A:
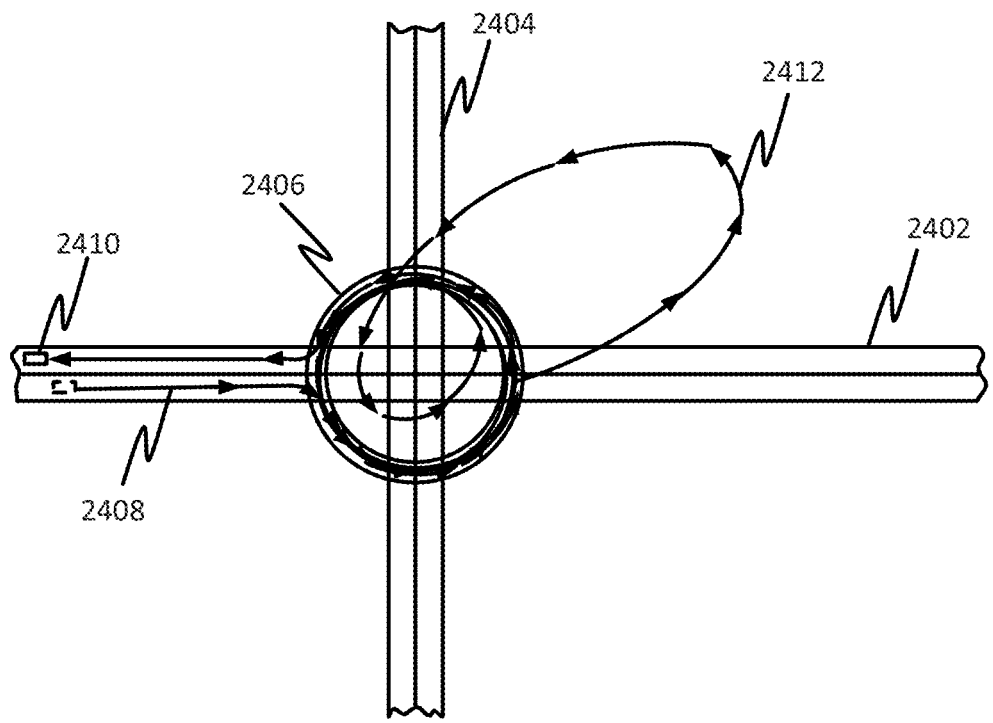
FIG. 24A is an illustration showing an error in a location track evidenced by a first mobile device (not shown), in a first vehicle, that did not include or use the methods and apparatus described herein.

FIG. 24A is an illustration showing an error 2412 in a location track 2408 evidenced by a first mobile device (not shown), in a first vehicle 2410, that did not include or use the methods and apparatus described herein. FIG. 24A represents an actual use case of the first mobile device (not shown) in the first vehicle 2410 in a city. The illustration of FIG. 24A includes an east-west highway 2402, a north-south highway 2404, a traffic circle 2406 centered on an intersection between the east-west highway 2402 and the north-south highway 2404 (the traffic circle 2406 is beneath the overpasses of the east-west highway 2402 and the north-south highway 2404), and a location track 2408 of the first vehicle 2410 (as reported by the first mobile device (not shown) travelling in the first vehicle 2410) entering the traffic circle 2406 from the east and driving multiple times around the traffic circle 2406 before exiting the traffic circle 2406 and continuing toward the west on the east-west highway 2402. The location track 2408 displays the error 2412 which caused the first mobile device (not shown) to falsely report the location of the first mobile device as the first mobile device repeatedly travelled about the traffic circle 2406. The error 2412 may be caused by a buildup of errors in the inertial navigation system of the first mobile device.

Figure 24B:
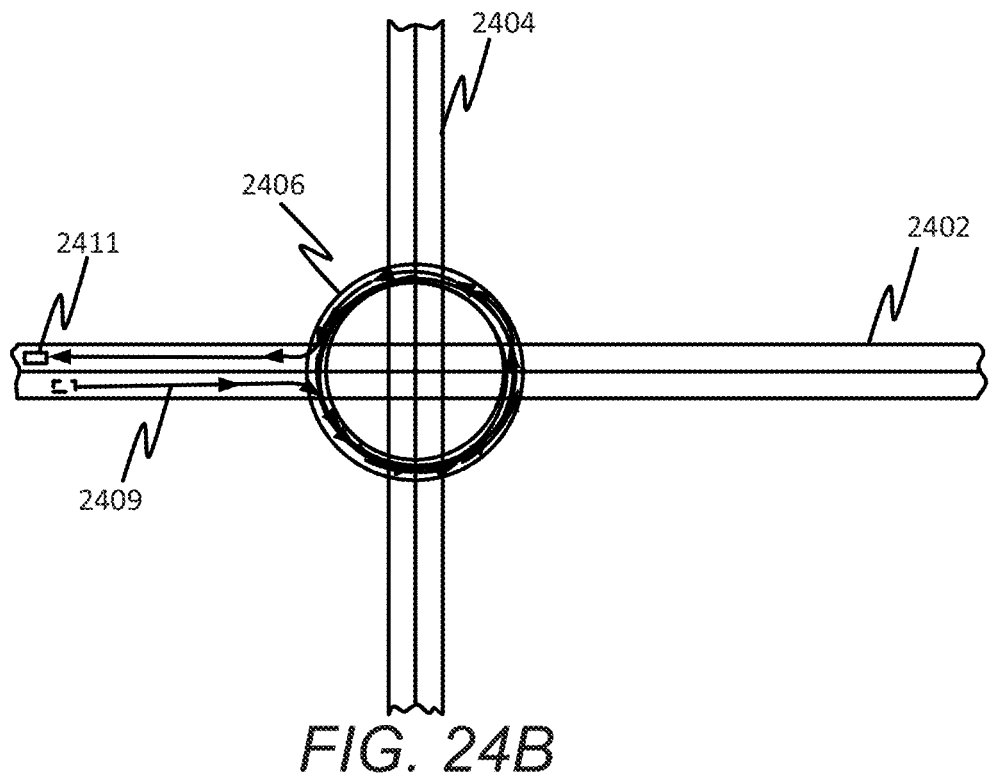
FIG. 24B is an illustration showing a correct location track evidenced by a second mobile device (not shown), in a second vehicle, that did include and use the methods and apparatus described herein.

FIG. 24B is an illustration showing a correct location track 2409 evidenced by a second mobile device (not shown), in a second vehicle 2411, that did include and use the methods and apparatus described herein. FIG. 24B represents an actual use case of the second mobile device (not shown) in the second vehicle 2411 in a city. The illustration of FIG. 24B includes the east-west highway 2402, the north-south highway 2404, the traffic circle 2406 centered on the intersection between the east-west highway 2402 and the north-south highway 2404 (the traffic circle 2406 is beneath the overpasses of the east-west highway 2402 and the north-south highway 2404), and the correct location track 2409 of the second vehicle 2411 (as reported by the second mobile device (not shown) travelling in the second vehicle 2411) entering the traffic circle 2406 from the east and driving multiple times around the traffic circle 2406 before exiting the traffic circle 2406 and continuing toward the west on the east-west highway 2402. In contrast to FIG. 24A, the correct location track 2409 remains mapped onto the traffic circle 2406.

Within the present disclosure, use of the construct "A and/or B" may mean "A or B or A and B" and may alternatively be expressed as "A, B, or a combination thereof" or "A, B, or both". Within the present disclosure, use of the construct "A, B, and/or C" may mean "A or B or C, or any combination thereof" and may alternatively be expressed as "A, B, C, or any combination thereof." Within the present disclosure, use of the construct "at least two of A, B, or C" may mean "A and B, or A and C, or B and C, or A, B, and C."

One or more of the components, processes, features, and/or functions illustrated in FIGS. 1-23 may be rearranged and/or combined into a single component, process, feature or function or may be present in several components, processes, or functions. Additional elements, components, processes, and/or functions may also be added without departing from the disclosure.

The word "beneath" may mean lower than, under, or below something. Use of the term "beneath" may contemplate a presence of one or more intermediate elements occupying the space between a referenced element and an item described as being "beneath" the referenced element.

The word "exemplary" is used herein to mean "serving as an example, instance, or illustration." Any implementation or aspect described herein as "exemplary" is not necessarily to be construed as preferred or advantageous over other implementations or aspects described herein.

Likewise, the term "aspects" does not require that all aspects of the disclosure include the discussed feature, advantage or mode of operation.

The word "determine" may mean get, acquire, derive, obtain, calculate, or the like.

The term "coupled" is used herein to refer to the direct or indirect coupling between two objects. For example, if object A physically touches object B, and object B touches object C, then objects A and C may still be considered coupled to one another—even if they do not directly physically touch each other.

Also, it is noted that various disclosures contained herein may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed.

While the foregoing disclosure shows illustrative aspects, it should be noted that various changes and modifications could be made herein without departing from the scope of the disclosure as defined by the appended claims. The functions, steps and/or actions of the method claims in accordance with the aspects described herein need not be performed in any particular order. Furthermore, although elements of aspects may be described or claimed in the singular, the plural is contemplated unless limitation to the singular is explicitly stated.

The previous description of the disclosed aspects is provided to enable any person skilled in the art to make or use the aspects described herein. Various modifications to the disclosed aspects will be readily apparent to those of skill in the art, and the generic principles defined herein may be applied to other aspects without departing from the spirit or scope of the aspects described herein. Thus, the spirit or scope are not intended to be limited to the aspects shown herein but is to be accorded the widest scope consistent with the principles and novel features disclosed herein.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or steps.

What is claimed is:

1. A mobile device, comprising:
a global navigation satellite system (GNSS) receiver;
a plurality of accelerometers;
a plurality of gyroscopes;
an inertial navigation system (INS) operationally coupled to the GNSS receiver, the plurality of accelerometers, and the plurality of gyroscopes; and
a motion-bias-orientation circuit operationally coupled to the GNSS receiver, the plurality of accelerometers, the plurality of gyroscopes, and INS, the motion-bias-orientation circuit is configured to:
determine accelerometer bias of the plurality of accelerometers based on output of the plurality of accelerometers,
determine gyroscope bias of the plurality of gyroscopes based on output of the plurality of gyroscopes,
determine a first spatial relationship between a first frame of reference of the mobile device and a second frame of reference of a vehicle transporting the mobile device, based on output from at least two of the GNSS receiver, the plurality of accelerometers, or the plurality of gyroscopes,
determine a second spatial relationship between the first frame of reference of the mobile device and a third frame of reference of a surface beneath the vehicle, based on output from at least two of the GNSS receiver, the plurality of accelerometers, or the plurality of gyroscopes, and
initialize the INS with the accelerometer bias, the gyroscope bias, the first spatial relationship, and the second spatial relationship upon determining that the mobile device is stationary relative to the vehicle transporting the mobile device.

2. The mobile device of claim 1, further comprising a non-vehicle motion detector operationally coupled to the plurality of gyroscopes and configured to classify motion of the mobile device according to both a first state in which the motion of the mobile device includes non-vehicle motion and a second state in which the motion of the mobile device is due to vehicle motion alone and determine that the mobile device is stationary relative to the vehicle transporting the mobile device when the motion of the mobile device is in the second state.

3. The mobile device of claim 2, wherein the motion-bias-orientation circuit initializes the INS with the accelerometer bias, the gyroscope bias, the first spatial relationship, and the second spatial relationship upon a change of state from the first state to the second state.

4. The mobile device of claim 2, wherein the motion-bias-orientation circuit is further configured to:
re-determine the first spatial relationship;
re-determine the second spatial relationship; and
initialize the INS with the accelerometer bias, the gyroscope bias, the re-determined first spatial relationship, and the re-determined second spatial relationship upon a change of state from the first state to the second state.

5. The mobile device of claim 2, wherein the non-vehicle motion detector is further configured to:
determine a difference between angles of a first rotation vector measured by the plurality of gyroscopes at a first time and a second rotation vector measured by the plurality of gyroscopes at a second time; and
indicate that the mobile device is in the second state if the difference between the angles is less than a predetermined value.

6. The mobile device of claim 5, wherein a difference in time between the first time and the second time is a time between successive refreshes of data determined from the plurality of gyroscopes.

7. The mobile device of claim 1, wherein the first spatial relationship is expressed as a first set of Euler angles, a first set of Tait-Bryan angles, or a first rotation matrix and the second spatial relationship is expressed as a second set of Euler angles, a second set of Tait-Bryan angles, or a second rotation matrix.

8. The mobile device of claim 1, wherein the plurality of accelerometers measure acceleration along three orthogonal axes of the first frame of reference and the plurality of gyroscopes measure rotation about the three orthogonal axes.

9. A method of initializing an inertial navigation system (INS) of a mobile device, the method operational at the mobile device, comprising:
determining accelerometer bias of a plurality of accelerometers of the mobile device based on output of the plurality of accelerometers;
determining gyroscope bias of a plurality of gyroscopes of the mobile device based on output of the plurality of gyroscopes;
determining a first spatial relationship between a first frame of reference of the mobile device and a second frame of reference of a vehicle transporting the mobile device, based on output of at least two of a global navigation satellite system (GNSS) receiver, the plurality of accelerometers, or the plurality of gyroscopes;
determining a second spatial relationship between the first frame of reference of the mobile device and a third frame of reference of a surface beneath the vehicle, based on output of at least two of the GNSS receiver, the plurality of accelerometers, or the plurality of gyroscopes; and
initializing the INS with the accelerometer bias, the gyroscope bias, the first spatial relationship, and the second spatial relationship upon determining that the mobile device is stationary relative to the vehicle transporting the mobile device.

10. The method of claim 9, further comprising:
classifying, by a non-vehicle motion detector operationally coupled to the plurality of gyroscopes, motion of the mobile device according to both a first state in which the motion of the mobile device includes non-vehicle motion and a second state in which the motion of the mobile device is due to vehicle motion alone, and
determining that the mobile device is stationary relative to the vehicle transporting the mobile device when the motion of the mobile device is in the second state.

11. The method of claim 10, further comprising initializing the INS with the accelerometer bias, the gyroscope bias, the first spatial relationship, and the second spatial relationship upon a change of state from the first state to the second state.

12. The method of claim 10, further comprising:
re-determining the first spatial relationship,
re-determining the second spatial relationship, and
initializing the INS with the accelerometer bias, the gyroscope bias, the re-determined first spatial relationship, and the re-determined second spatial relationship upon a change of state from the first state to the second state.

13. The method of claim 10, further comprising:
determining, by the non-vehicle motion detector, a difference between angles of a first rotation vector measured by the plurality of gyroscopes at a first time and a second rotation vector measured by the plurality of gyroscopes at a second time; and
indicating that the mobile device is in the second state if the difference between the angles is less than a predetermined value.

14. The method of claim 13, wherein a difference in time between the first time and the second time is a time between successive refreshes of data determined from the plurality of gyroscopes.

15. The method of claim 9, wherein the first spatial relationship is expressed as a first set of Euler angles, a first set of Tait-Bryan angles, or a first rotation matrix and the second spatial relationship is expressed as a second set of Euler angles, a second set of Tait-Bryan angles, or a second rotation matrix.

16. The method of claim 9, wherein determining the accelerometer bias of the plurality of accelerometers and the gyroscope bias of the plurality of gyroscopes comprises:
determining that the vehicle and the mobile device are stationary;
determining a static acceleration vector from the plurality of accelerometers while the vehicle and the mobile device are stationary;
determining a static rotation vector from the plurality of gyroscopes while the vehicle and the mobile device are stationary;
subtracting a gravity vector from the static acceleration vector to determine the accelerometer bias; and
subtracting the gravity vector from the static rotation vector to determine the gyroscope bias.

17. The method of claim 9, wherein determining the first spatial relationship between the first frame of reference of the mobile device and the second frame of reference of the vehicle comprises:
determining a forward acceleration vector in a horizontal plane that is representative of acceleration of the vehicle moving in a straight-line direction;
determining a right-forward acceleration vector in the horizontal plane that is representative of acceleration of the vehicle moving in a right-forward turn direction;

determining an up acceleration vector having a direction that is perpendicular to the horizontal plane based on the forward acceleration vector and the right-forward acceleration vector; and determining the first spatial relationship based on the forward acceleration vector, the right-forward acceleration vector, and the up acceleration vector.

18. The method of claim 17, wherein determining the up acceleration vector having the direction that is perpendicular to the horizontal plane based on the forward acceleration vector and the right-forward acceleration vector comprises:
determining a cross product of the right-forward acceleration vector and the forward acceleration vector.

19. The method of claim 17, wherein the mobile device determines that the vehicle is moving on the horizontal plane by determining that an angular difference between a static acceleration vector and a rotation vector as measured using the plurality of gyroscopes is less than a predetermined value.

20. The method of claim 17, wherein the mobile device determines that the vehicle is moving on the horizontal plane by determining that a dot product of a static acceleration vector and a rotation vector as measured using the plurality of gyroscopes is greater than a predetermined value.

21. A non-transitory machine-readable storage medium having one or more instructions stored thereon, which when executed by at least one processing circuit of a mobile device causes the at least one processing circuit to:
determine accelerometer bias of a plurality of accelerometers of the mobile device based on output of the plurality of accelerometers;
determine gyroscope bias of a plurality of gyroscopes of the mobile device based on output of the plurality of gyroscopes;
determine a first spatial relationship between a first frame of reference of the mobile device and a second frame of reference of a vehicle transporting the mobile device, based on output of at least two of a global navigation satellite system (GNSS) receiver, the plurality of accelerometers, or the plurality of gyroscopes;
determine a second spatial relationship between the first frame of reference of the mobile device and a third frame of reference of a surface beneath the vehicle, based on output of at least two of the GNSS receiver, the plurality of accelerometers, or the plurality of gyroscopes; and
initialize an inertial navigation system (INS) of the mobile device with the accelerometer bias, the gyroscope bias, the first spatial relationship, and the second spatial relationship upon determining that the mobile device is stationary relative to the vehicle transporting the mobile device.

22. The non-transitory machine-readable storage medium of claim 21, wherein the one or more instructions further cause a non-vehicle motion detector operationally coupled to the plurality of gyroscopes and configured to classify motion of the mobile device according to both a first state in which the motion of the mobile device includes non-vehicle motion and a second state in which the motion of the mobile device is due to vehicle motion alone to determine that the mobile device is stationary relative to the vehicle transporting the mobile device when the motion of the mobile device is in the second state.

23. The non-transitory machine-readable storage medium of claim 22, wherein the one or more instructions further cause the at least one processing circuit to initialize the INS with the accelerometer bias, the gyroscope bias, the first spatial relationship, and the second spatial relationship upon a change of state from the first state to the second state.

24. The non-transitory machine-readable storage medium of claim 22, wherein the one or more instructions further cause the at least one processing circuit to:
re-determine the first spatial relationship;
re-determine the second spatial relationship; and
initialize the INS with the accelerometer bias, the gyroscope bias, the re-determined first spatial relationship, and the re-determined second spatial relationship upon a change of state from the first state to the second state.

25. A mobile device, comprising:
a global navigation satellite system (GNSS) receiver;
a plurality of accelerometers;
a plurality of gyroscopes;
an inertial navigation system (INS) operationally coupled to the GNSS receiver, the plurality of accelerometers, and the plurality of gyroscopes; and
means for determining accelerometer bias of the plurality of accelerometers based on output of the plurality of accelerometers;
means for determining gyroscope bias of the plurality of gyroscopes based on output of the plurality of gyroscopes;
means for determining a first spatial relationship between a first frame of reference of the mobile device and a second frame of reference of a vehicle transporting the mobile device, based on output from at least two of the GNSS receiver, the plurality of accelerometers, or the plurality of gyroscopes;
means for determining a second spatial relationship between the first frame of reference of the mobile device and a third frame of reference of a surface beneath the vehicle, based on output from at least two of the GNSS receiver, the plurality of accelerometers, or the plurality of gyroscopes; and
means for initializing the INS with the accelerometer bias, the gyroscope bias, the first spatial relationship, and the second spatial relationship upon determining that the mobile device is stationary relative to the vehicle transporting the mobile device.

26. The mobile device of claim 25, further comprising means for classifying motion of the mobile device according to both a first state in which the motion of the mobile device includes non-vehicle motion and a second state in which the motion of the mobile device is due to vehicle motion alone and determine that the mobile device is stationary relative to the vehicle transporting the mobile device when the motion of the mobile device is in the second state.

27. The mobile device of claim 26, wherein the means for initializing the INS provides the INS with the accelerometer bias, the gyroscope bias, the first spatial relationship, and the second spatial relationship upon a change of state from the first state to the second state.

28. The mobile device of claim 26, wherein:
the means for determining the first spatial relationship re-determines the first spatial relationship;
the means for determining the second spatial relationship re-determines the second spatial relationship; and
the means for initializing the INS provides the INS with the accelerometer bias, the gyroscope bias, the re-determined first spatial relationship, and the re-determined second spatial relationship upon a change of state from the first state to the second state.

* * * * *